(12) United States Patent
Williams et al.

(10) Patent No.: US 6,366,529 B1
(45) Date of Patent: Apr. 2, 2002

(54) FAST FIFO MEMORY STORAGE SYSTEM

(75) Inventors: Kenneth L. Williams, Sherman; Rakesh N. Joshi, McKinney, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/651,214

(22) Filed: Aug. 30, 2000

(51) Int. Cl.[7] .................................................. G11C 8/00
(52) U.S. Cl. ............... 365/239; 365/189.02; 365/230.05
(58) Field of Search ........................... 365/239, 189.02, 365/230.05, 189.01, 230.01

(56) References Cited

U.S. PATENT DOCUMENTS 4,954,987 A * 9/1990 Auvinen et al. ....... 365/189.02
5,027,326 A * 6/1991 Jones ......................... 365/221
5,255,242 A * 10/1993 Ward et al. ............. 365/230.03
5,473,756 A * 12/1995 Traylor ....................... 395/250
6,072,781 A * 6/2000 Feeney et al. .............. 370/282

* cited by examiner

*Primary Examiner*—Hoai V. Ho
(74) *Attorney, Agent, or Firm*—Dwight N. Holmbo; Wade James Brady III; Fredick J. Telecky Jr.

(57) ABSTRACT

A fast FIFO memory system stores identical data in both static RAM memory and FIFO memory. Data is transferred from the FIFO when insufficient RAM read time is available. When the FIFO is full, additional data is stored in the RAM which runs at a much slower speed than the FIFO. Data is then transferred from the RAM until the FIFO is no longer full, at which time the memory system again functions at the faster FIFO speed.

14 Claims, 20 Drawing Sheets

FAST FIFO MEMORY STORAGE SYSTEM

RELATED PATENT APPLICATIONS

This application is related to U.S. Patent Application entitled Fast Reprogrammable FIFO Status Flags System, Ser. No. 09/634,449, filed on Aug. 8, 2000, by Kenneth L. Williams and Rakesh N. Joshi.

BACKGROUND OF THE INVENTION

1. Field of the Invention

This invention relates generally to FIFO memories, and more particularly to a fast FIFO memory storage system implemented substantially from traditional sequential memory elements.

2. Description of the Prior Art

Recent advancements in technology continue to provide data processing and communication devices that transmit and process data at ever increasing speeds. In order to accommodate these increased data transmission and data processing speeds, there is now a need to provide even faster FIFO memory storage systems. Such memory storage system should be capable of supporting write and read operations at far faster rates and with far shorter data access times than possible with the fastest available compiled static random access memories (RAM)s.

U.S. Pat. No. 5,255,242, entitled Sequential Memory, issued Oct. 19, 1993 to Ward, et al., and assigned to the assignee of the present invention, discloses a sequential memory using interleaved memories with associated output buffers to accomplish high data rates. U.S. Pat. No. 5,255,242 is incorporated by reference herein in its entirety. The technique disclosed by the '242 patent uses data access control circuitry and bank select circuitry to control the order in which the memory banks are written to and read from. The technique disclosed by the '242 patent further uses output buffer circuits allowing a data word to be read instantaneously after it has been written to the sequential memory. Although the invention disclosed and claimed by Ward et al. in the '242 patent combines slower sequential memory units to obtain a faster sequential memory system, that system operates at about only twice the operating frequency of the separate memory units. The invention of Ward et al. allows several read clock cycles before requiring data to appear on the outputs, so the data access time does not need to be as short as required to support the above discussed increased data transmission and processing speeds.

In view of the foregoing, there is a need for a fast FIFO memory storage system capable of operation at nearly three times the write and read frequencies of currently available RAMs. Such a system should preferably include a sufficiently fast cache system to temporarily store data in situations where the required data access time is shorter than that achievable using currently available RAMs. The FIFO memory storage system should preferably be designed in ASIC standard cell design flow using off-the-shelf gate and memory modules manufactured via a well-known, long-standing, inexpensive process to achieve high speed operation with very high reliability, least cost, and shorter design cycle times than that achievable using custom circuitry.

SUMMARY OF THE INVENTION

The present invention is directed to a fast FIFO memory data storage system that is implemented using slower memory storage elements that by themselves are not capable of operation at data processing speeds achievable with the fast FIFO memory data storage system. According to one embodiment, the system includes four RAM blocks, a write ring-counter, a read ring-counter, a plurality of write and read enabling gates, a one-of-four data selector, a data output select multiplexer (mux), and an output register.

The write ring-counter generates four write-select signals (WS0–WS3). Upon a low level system reset, WS0 is preset to high, and WS1–WS3 to low. If reset is high, a primary write enable is high, and there is a low-to-high transition of the write clock. This advances the write ring-counter to the next state where WS1 is high and WS0–WS3 are low. At any time, only one of the write-select signals is high. At the same time, if the primary write-enable is high, then a secondary write-enable signal corresponding to the currently high write-select signal will be high. When one of the secondary write-enable signals is high when the write clock goes high, the data word on the input data bus gets written into the corresponding RAM block.

The read ring-counter functions in the same manner as the write ring-counter. A read-select signal (RS0–RS3) selects which RAM block output word to send to the output register. If a primary read-select signal is high and the read clock goes from low-to-high, the selected output word is clocked into the output register, a new output word is read from the selected RAM block, and the read ring-counter advances to the next state. Upon a low level on the system reset, all of the bits in the output register are cleared.

Each RAM block includes a small FIFO memory element to accommodate processing of output data from the RAM block at certain times when the written data must be available at the RAM block output even before sufficient time for a RAM read has elapsed. Data on the data input bus is written to the small FIFO on a rising edge of the write clock while the primary write-enable is high. Data written to the small FIFO is available to be read out much faster than RAM data. According to one embodiment, the small FIFO capacity is four words. Therefore, once four words have been written, the small FIFO is full and additional write attempts are ignored until one or more words have been read out of the small FIFO. New data is read out of the small FIFO on a rising edge of its read clock while the primary FIFO read-enable is high. When the small FIFO is empty, the first word written automatically appears on the small FIFO output. The small FIFO also stores (in parallel with the data word) the write address associated with the data word for use in arbitrating whether RAM or small FIFO data are sent to the RAM block output. The system reset, when taken low, also resets the small FIFO to its empty state.

In one aspect of the invention, a fast FIFO memory storage system is implemented using slower memory storage units.

In yet another aspect of the invention, a fast FIFO memory storage system is implemented in which writes and reads can occur at far faster rates and with far shorter data access times than possible with the fastest available compiled static RAMs.

In still another aspect of the invention a fast FIFO memory storage system is implemented to provide a memory system capable of operating at nearly three times the write and read frequencies of presently available RAMs.

Another aspect of the invention is associated with providing a fast FIFO memory storage system in accordance with ASIC standard cell design flow using off-the-shelf gate and memory modules built in an older, less-expensive process to accommodate high speed operation with very high reliability, minimal cost, and very short design cycle times when compared with present design practices.

BRIEF DESCRIPTION OF THE DRAWINGS

Other aspects and features of the present invention and many of the attendant advantages of the present invention will be readily appreciated as the same become better understood by reference to the following detailed description when considered in connection with the accompanying drawings in which like reference numerals designate like parts throughout the figures thereof and wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Figure 1:
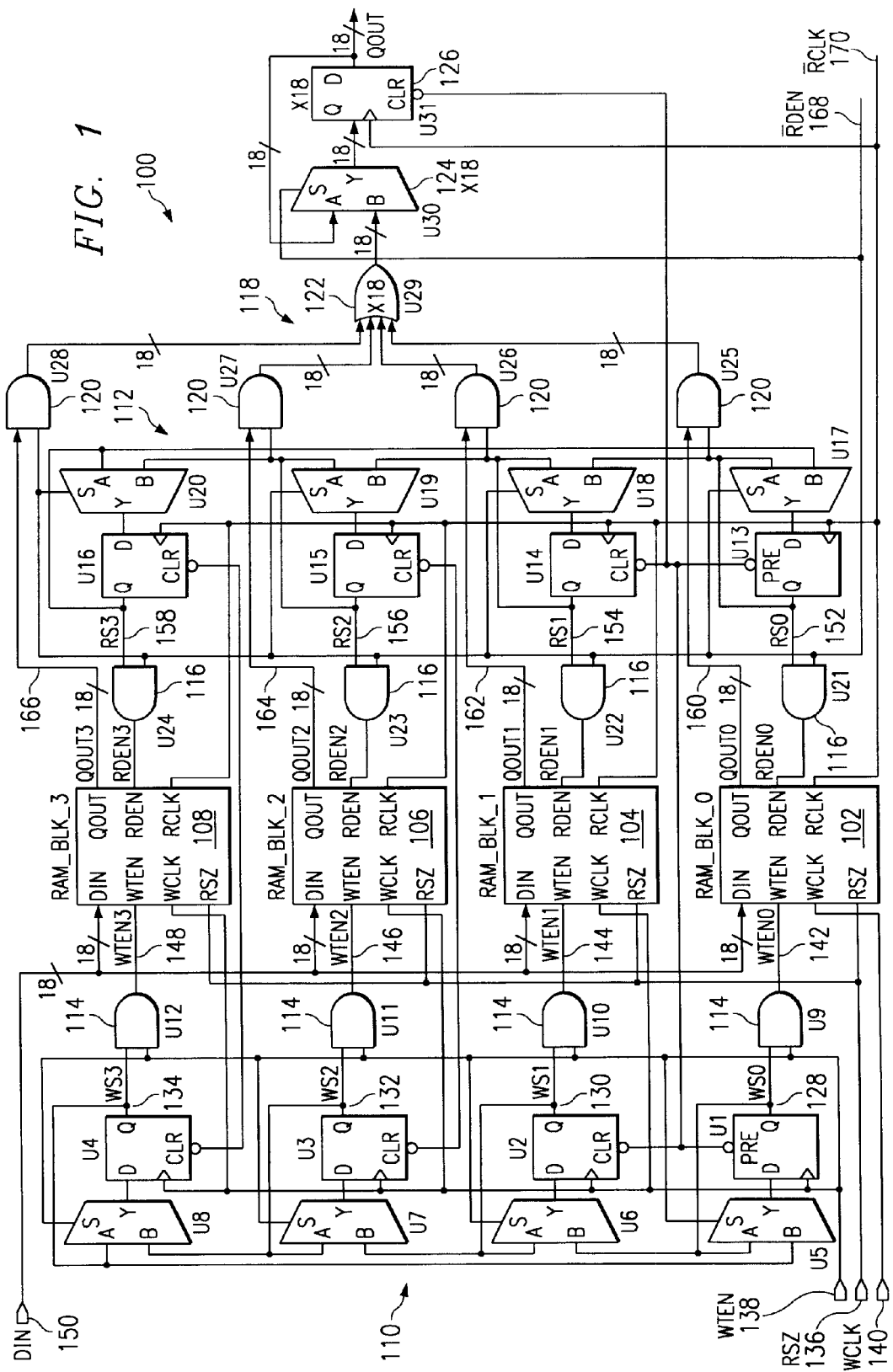
FIG. 1 is a high level block diagram illustrating a fast, memory storage system according to one embodiment of the present invention.

FIG. 1 is a high level block diagram illustrating a fast, memory storage system 100 according to one embodiment of the present invention. The system 100 can be seen to include four RAM blocks (RAM_BLK_0–RAM_BLK_3) 102–108, a write ring-counter 110, including elements U1–U8, a read ring-counter 112, including elements U13–U20, write enabling gates 114, including elements U9–U12, read enabling gates 116, including elements U21–U24, an 18-bit one-of-four data selector 118, including gates U25–U28 (120) and gate U29 (122), a data output select mux 124 (U30), and an output register 126 (U31).

The write ring-counter 110 generates the four write-select signals (WS0–WS3) 128–134. Upon a low level on RSZ 136, WS0 (128) is preset to high, and WS1–WS3 (130–134) to low. If RSZ 136 is high, WTEN 138 is high, and there is a low-to-high transition on WCLK 140, then the write ring-counter 110 advances to the next state where WS1 (130) is high and WS0, WS2 and WS3 (128, 132, 134) are low. At any time, only one of the write-select signals 128–134 is high. At the same time, if WTEN 138 is high, then the write-enable signal (WTEN0–WTEN3) 142–148 corresponding to the currently high write-select signal 128–134 will be high. When one of the write-enable signals 142–148 is high, when WCLK 140 goes high, the 18-bit data word on signal DIN 150 gets written into the corresponding RAM_BLK 102–108.

The read ring-counter 118 works in the same manner as the write ring-counter 110 described above. The read-select signal (RS0–RS3) 152–158 selects which RAM_BLK 102–108 QOUT signal (QOUT0–QOUT3) 160–166 to send to the output register 126 (U31). If RDEN 168 is high and RCLK 170 goes from low to high, the selected QOUT word 160–166 is clocked into the output register 126, a new QOUT value is read from the selected RAM_BLK 102–108, and the read ring-counter advances to the next state. Upon a low level on RSZ 136, the bits in the output register 126 are cleared.

Figure 2:
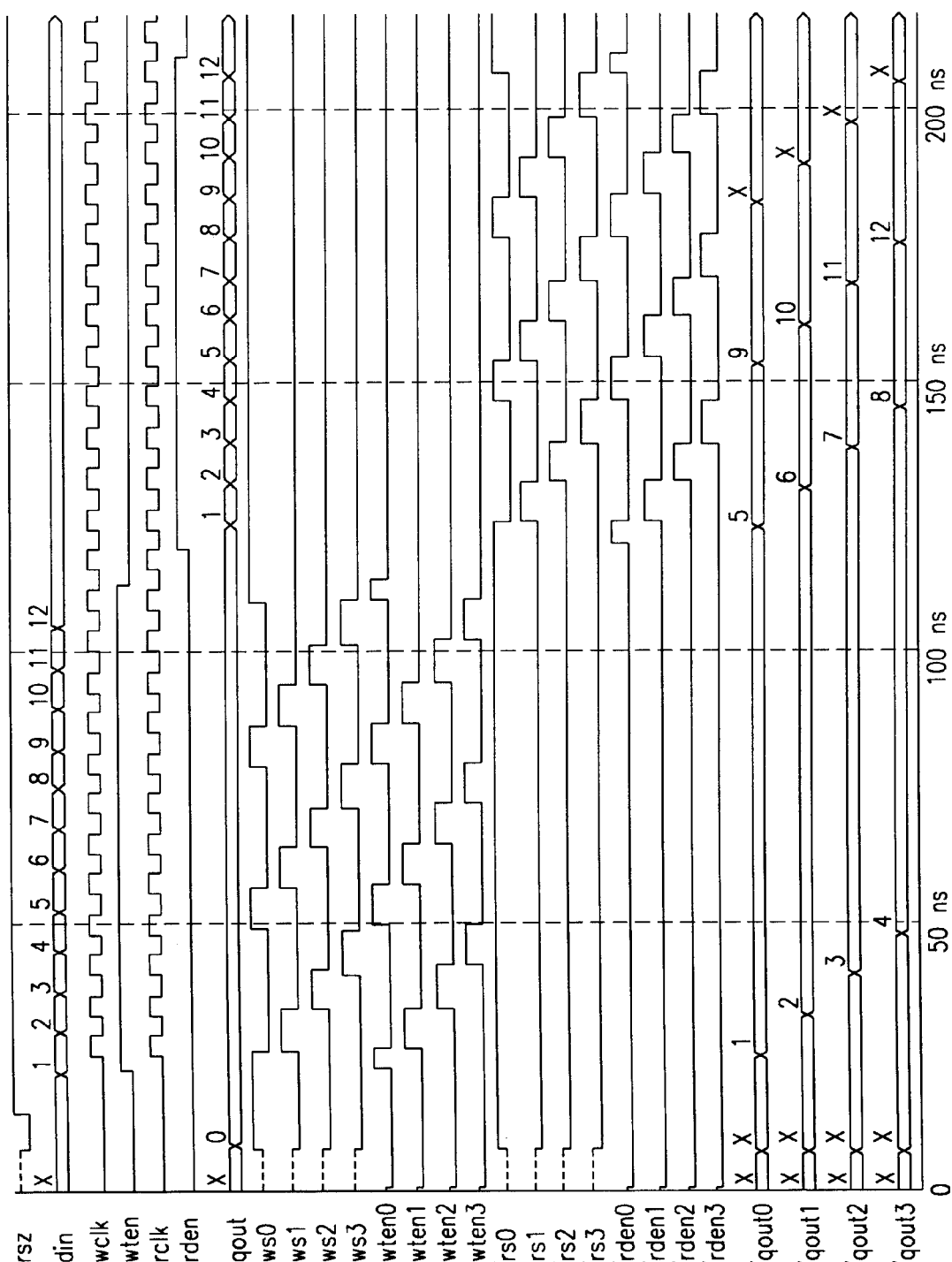
FIG. 2 is a timing diagram illustrating various signal timing relationships for the system shown in FIG. 1.

FIG. 2 is a timing diagram illustrating various signal timing relationships for the fast memory storage system 100 shown in FIG. 1.

Figure 3:
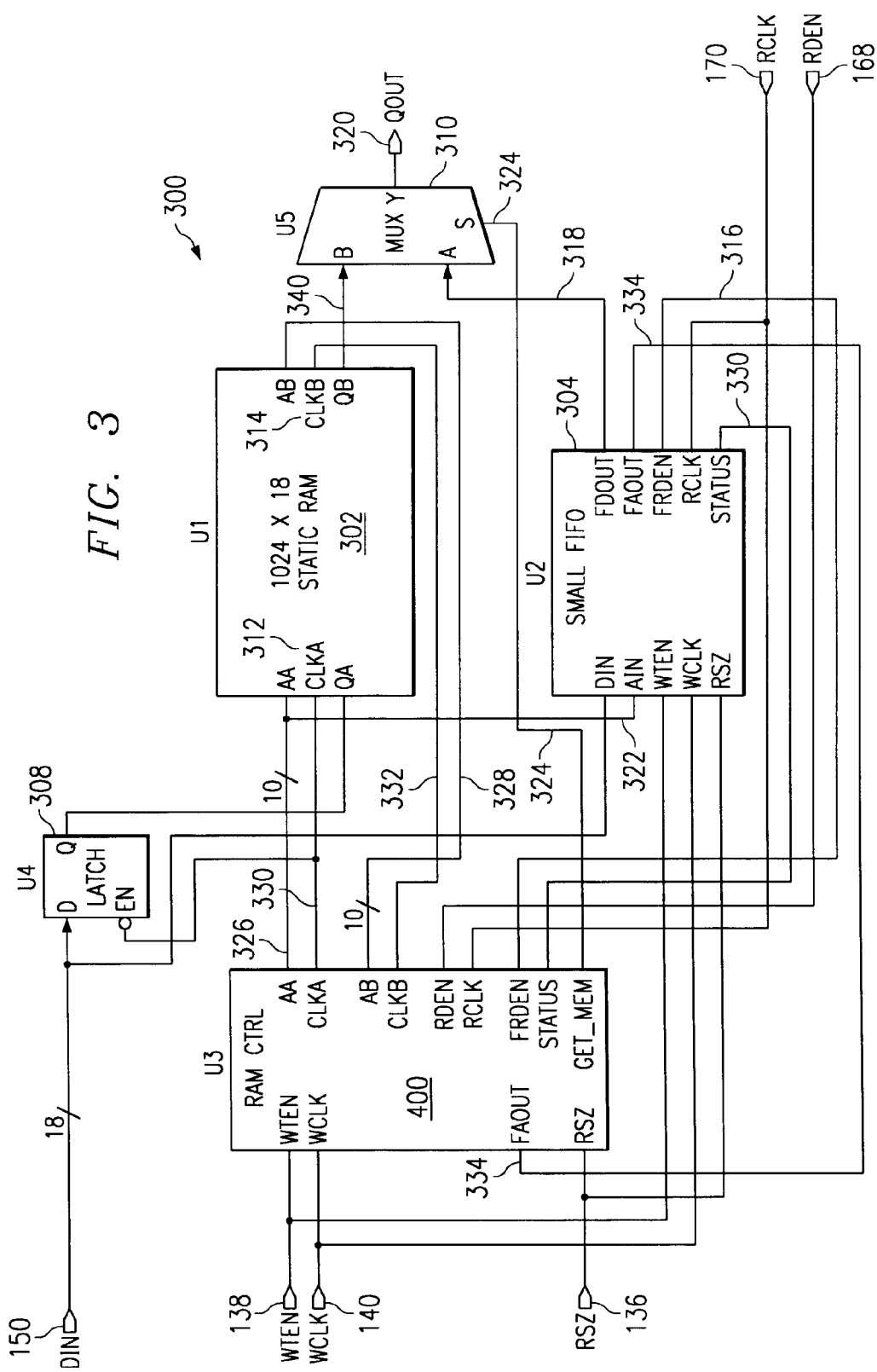
FIG. 3 is a schematic diagram illustrating in more detail, the RAM block (RAM_BLK) cells shown in FIG. 1.

FIG. 3 is a schematic diagram illustrating in more detail, one embodiment of a RAM block cell (RAM_BLK) 300 suitable for use with the fast memory storage system 100 shown in FIG. 1. The cell 300 can be seen to include a 1024-word×18-bit static RAM 302, a 4-word×(18+10)-bit SMALL_FIFO 304, a RAM_CTRL block 400, a DATA LATCH 308, and a MUX 310. Every data word written into this RAM_BLK 300 gets written into the RAM 302. The RAM 302 most preferably chosen for this embodiment is a standard compiler-generated dual-port static RAM. Port A 312 is enabled for data writes, and port B 314, for data reads. According to one embodiment, the write address (AA) preferably consists of ten bits and gets latched on the rising edge of CLKA. The input data passing through DATA LATCH 308 gets latched on the falling edge of CLKA and the write process begins. The DATA LATCH 308 is used to latch DIN 150 at the rising edge of CLKA and hold it there until it is latched in the RAM 302 on the falling edge. The read address (AB) gets latched on the rising edge of CLKB, the read process begins, and the data output appears on QB after the requisite access time has elapsed.

The SMALL FIFO 304 is required because at certain times, the written data must be available at QOUT 320 before sufficient time for a RAM 302 read has elapsed. Data on DIN 150 is written to the SMALL FIFO 304 on a rising edge of WCLK 140 while WTEN 138 is high. Data written to the SMALL FIFO 304 is available to be read out much faster than RAM 302 data. The maximum capacity of the SMALL FIFO 304 in the instant embodiment is four words. Therefore, once four words have been written, the SMALL FIFO 304 is full and additional write attempts are ignored until one or more words have been read out. New data is read out of the SMALL FIFO 304 on a rising edge of RCLK 170 while FRDEN 316 is high. When the SMALL FIFO 304 is empty, the first word written automatically appears on FDOUT 318. The SMALL FIFO also stores (in parallel with the data word) the 10-bit write address (AIN) 322 associated with that word for use in arbitrating whether RAM 302 or SMALL FIFO 304 data are sent to QOUT 320. Signal RSZ 136 is the whole device reset which, when taken low, resets the SMALL FIFO 304 to its empty state.

The MUX 310 selects whether RAM 302 or SMALL FIFO 304 data is sent to QOUT 320 based on the state of signal GET_MEM 324 from RAM CTRL 306. If GET_MEM 324 is high, RAM 302 data is selected, and if low, SMALL FIFO 304 data.

The RAM CTRL block 306 receives the write and read clocks 140, 170 and enables 138, 168 (WCLK, RCLK, WTEN and RDEN) respectively, and generates the write and read addresses (AA 326 and AB 328) and clocks (CLKA 330 and CLKB 332) required by the RAM 302. It also used the stored address (FAOUT 334) of the data word on FDOUT 318 in generating signal GET_MEM 324. If SMALL FIFO 304 data is selected for reading, then signal FRDEN 316 goes high to remove that word from the SMALL FIFO 304 and place the next word on FDOUT 318. A STATUS signal 330 from the SMALL FIFO 304 is also used at times to determine the state of GET_MEM 324. Signal RSZ 136, when low, sets the write and read addresses 326, 328 to '0'.

Figure 4A:
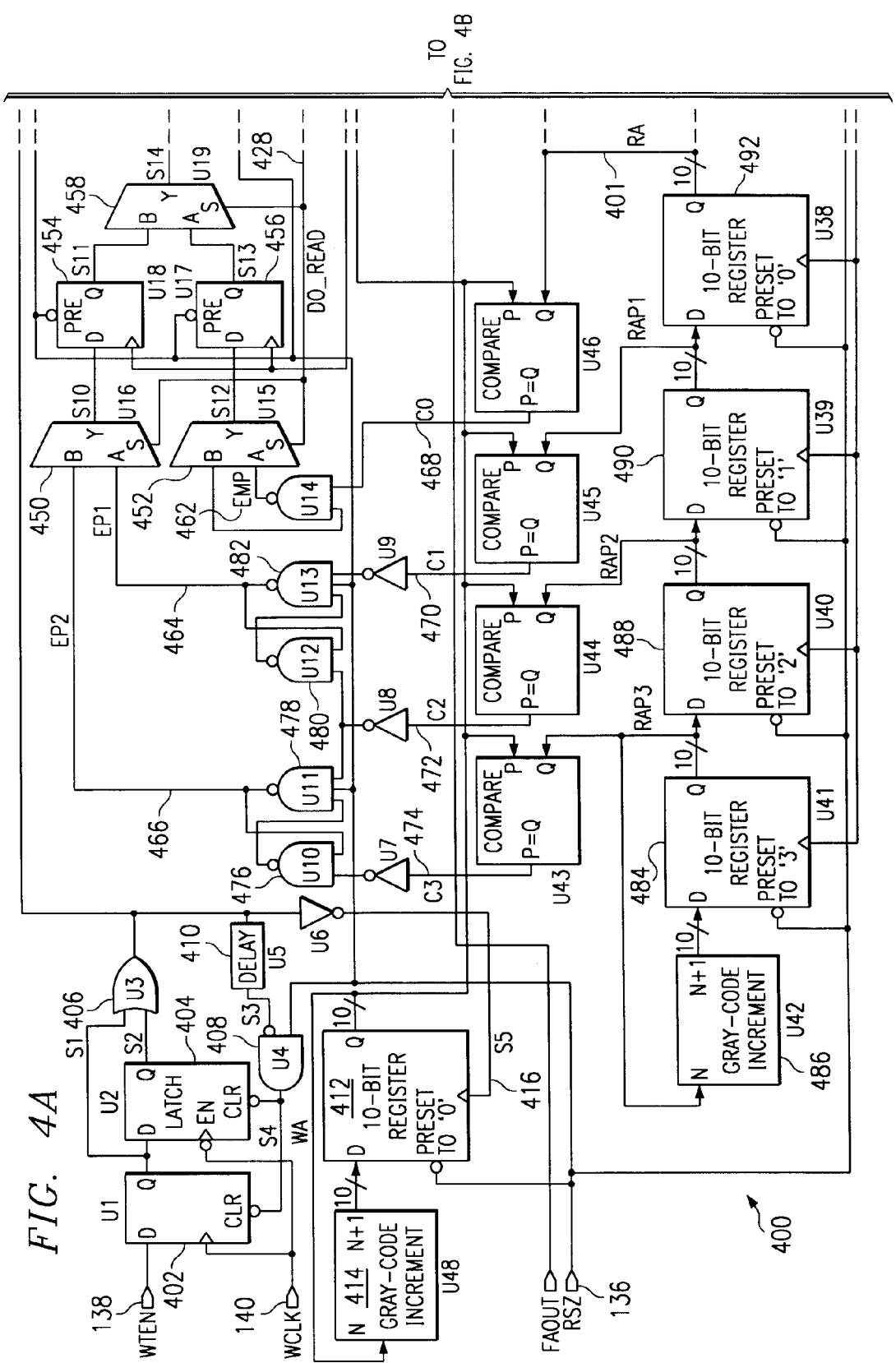
FIG. 4 is a detailed schematic diagram illustrating a RAM control (RAM_CTRL) cited with and integral to one of the RAM block cells shown in FIG. 1.
Figure 4B:
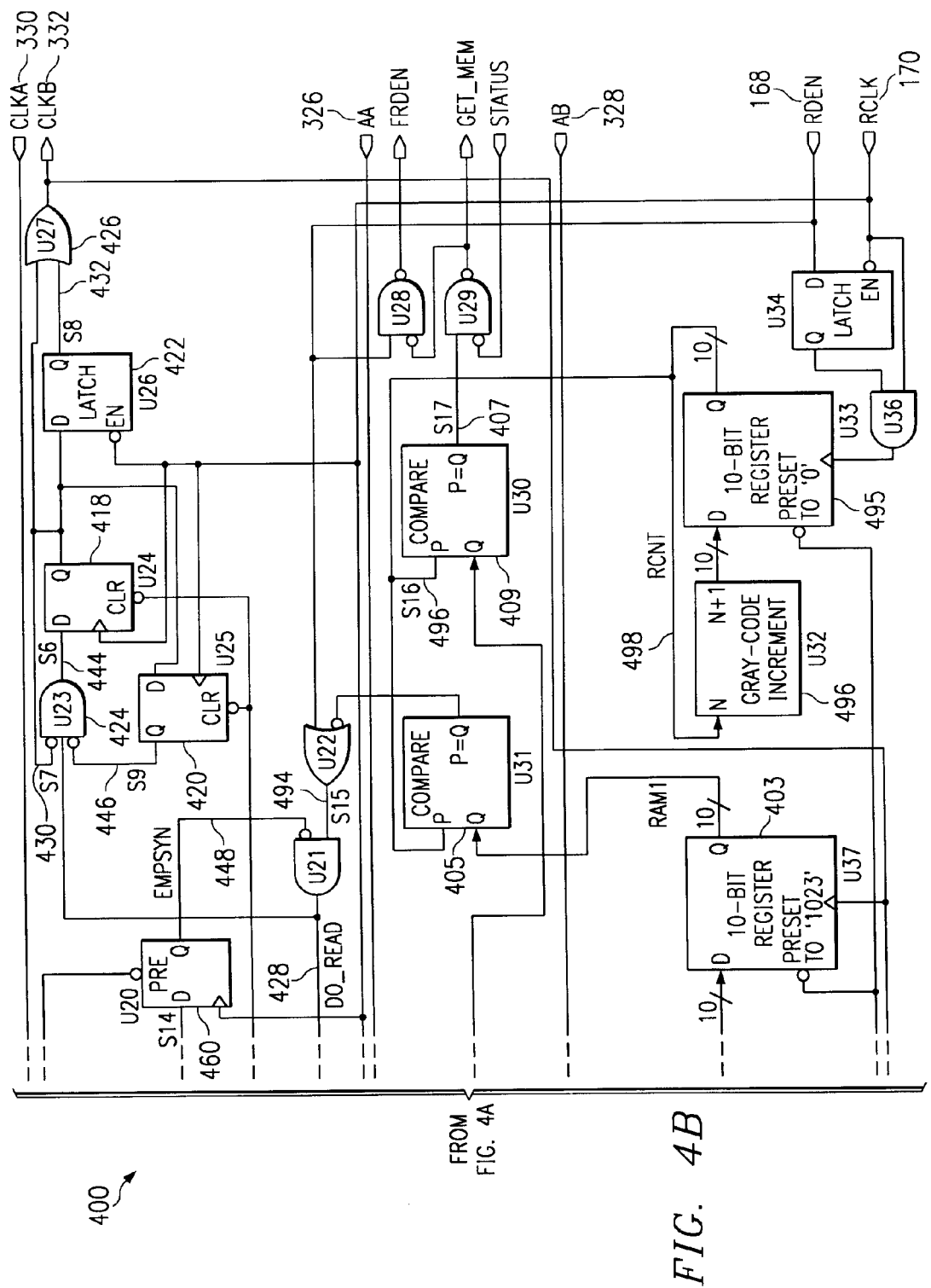

FIG. 4 is a detailed schematic diagram illustrating one embodiment of a RAM control (RAM_CTRL) circuit 400 associated with and integral to one of the RAM block cells 102–108 shown in FIG. 1. RAM_CTRL 400 receives the write and read clock 140, 170 and enable signals 138, 168 to generate the write and read addresses 326, 328 and clocks 330, 332 required by the RAM 302 and arbitrates whether SMALL FIFO 304 or RAM 302 data is sent to the data output QOUT 320.

Signal CLKA 330 acts as the RAM 302 write clock. As can be seen with reference to FIG. 2, a data write or read only occurs in each RAM_BLK 102–108 on every fourth WCLK 140 or RCLK 170 cycle. The minimum required write and read cycle times for the chosen RAMs is approximately 20 nsec–10 nsec minimum CLKA/B 330, 332 high time plus 10 nsec minimum CLKA/B 330, 332 low time. According to one embodiment, the minimum external clock cycle time chosen is 7.5 nsec with a 45% to 55% duty cycle. Thus, CLKA 330 and CLKB 332 can extend over multiple external WCLK 140 or RCLK 170 cycles.

Figure 5:
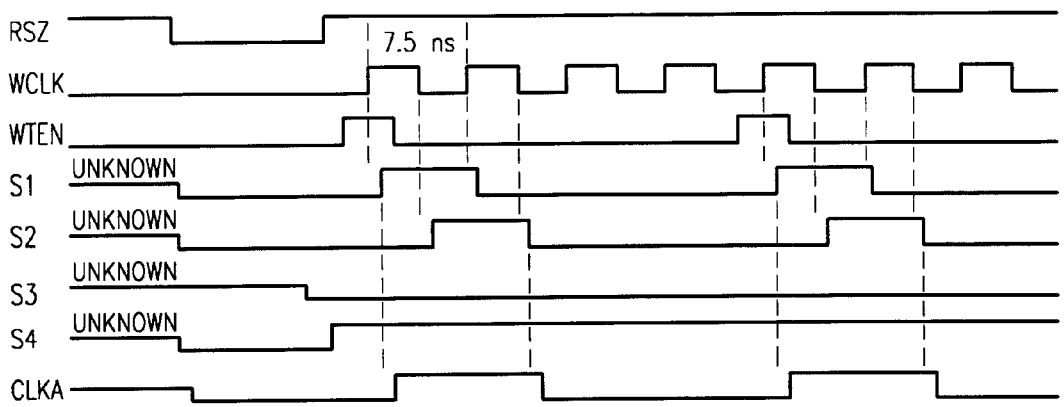
FIG. 5 is a timing diagram illustrating various signal timing relationships associated with a fast write clock for the RAM block cells and RAM control circuit shown in FIGS. 3 and 4 respectively.
Figure 6:
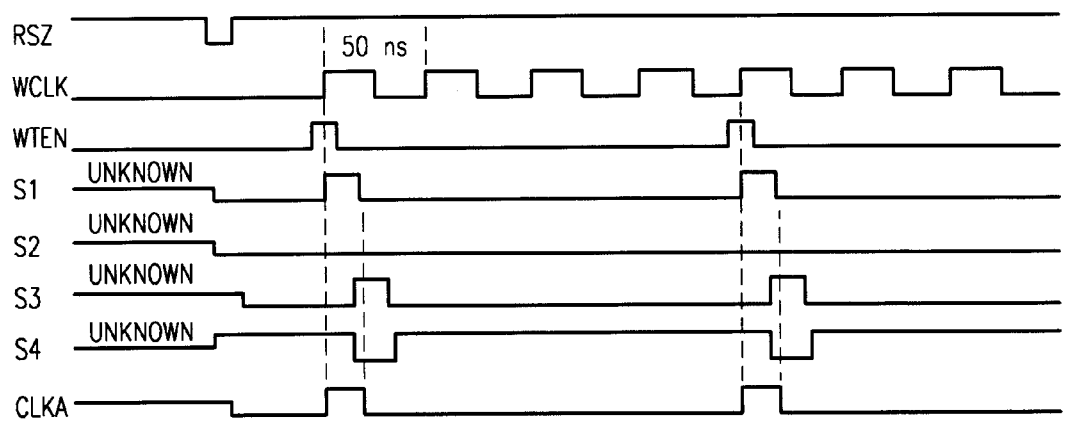
FIG. 6 is a timing diagram illustrating various signal timing relationships associated with a slow write clock for the RAM block cells and RAM control circuit shown in FIGS. 3 and 4 respectively.

The logic for generating CLKA 330 can be seen to include a clocked flip-flop 402, a transparent latch 404, two simple logic gates 406, 408, and a fixed delay 410 having an input to output delay of approximately 12 nsec. CLKA 330 operates in a oneshot mode with a fixed high time of approximately 11.25 to 13 nsec regardless of the cycle time of WCLK 140. The CLKA 330 cycle starts with the Q outputs of flip-flop 402 and latch 404 both at a low state. If WTEN 138 is high when WCLK 140 goes high, then the output of flip-flop 402 goes high. This sets CLKA 330 high through logic gate 406. Then, depending on the frequency of WCLK 140, there are two modes of operation. According to one embodiment, if WCLK 140 is at its maximum frequency of 133 MHz (1/7.5 nsec), then the timing illustrated in FIG. 5 applies. FIG. 5 is a timing diagram illustrating various signal timing relationships associated with a fast write clock 140 for the RAM block cell 300 and RAM control circuit 400 shown in FIGS. 3 and 4 respectively. When WCLK 140 falls after the first high transition, latch 404 is enabled and the value of the output at flip-flop 402 appears on latch 404. On the next high transition of WCLK 140, WTEN 138 is low so the output of flip-flop 402 falls. Since WCLK 140 is now high however, latch 404 latches the old value of the flip-flop 402 output onto latch 404. When WCLK 140 falls the second time, latch 404 is enabled again and the latch 404 output falls, causing CLKA 330 to fall. Assuming WCLK 140 has a 50% duty cycle, the width of the CLKA 330 pulse equals approximately 1.5×7.5 nsec, or 11.25 nsec. The design of delay 410 is most preferably such that if the width of an input pulse is less than approximately 12 nsec, its output does not switch, so the delay 410 output stays low. If WCLK 140 operates at a slower frequency, the timing illustrated in FIG. 6 applies. FIG. 6 is a timing diagram illustrating various signal timing relationships associated with a slow write clock 140 for the RAM block cell 300 and RAM control circuit 400 shown in FIGS. 3 and 4 respectively. As in FIG. 5, the first WCLK 140 high transition with WTEN 138 high sets the flip-flop 402 output high and therefore CLKA 330 high. After approximately 12 nsec, the delay 410 output goes high through logic gate 408, causing the output of logic gate 408 to go low. This clears flipflop 402 which returns its output low. WCLK 140 is still high, so latch 404 never gets enabled, causing its output to stay low. The width of the CLKA 330 pulse can be seen to equal approximately the sum of the propagation delays through latch 404, gates 406, 408, and delay 410, which total approximately 13 nsec.

The RAM 302 write address 326 is generated by a counter consisting of register 412 and incrementer 414. The register 412 is preset to the value of '0' when RSZ 136 is low. With RSZ 136 high, when CLKA 330 returns low ending the RAM 302 write cycle, signal S5 (416) goes high which causes write address 326 to advance to the next value as determined by incrementer 414. Incrementer 414 most preferably increments the value of write address 326 in a manner which allows the address to advance in a GRAY-CODE sequence in order to generate glitch-free status flags such as described in U.S. Pat. No. 5,084,841, entitled Programmable Status Flag Generator FIFO Using Gray Code, issued Jan. 28, 1992 to Williams, et al. and assigned to the assignee of the present invention. The '841 patent is incorporated by reference in its entirety herein.

Figure 7:
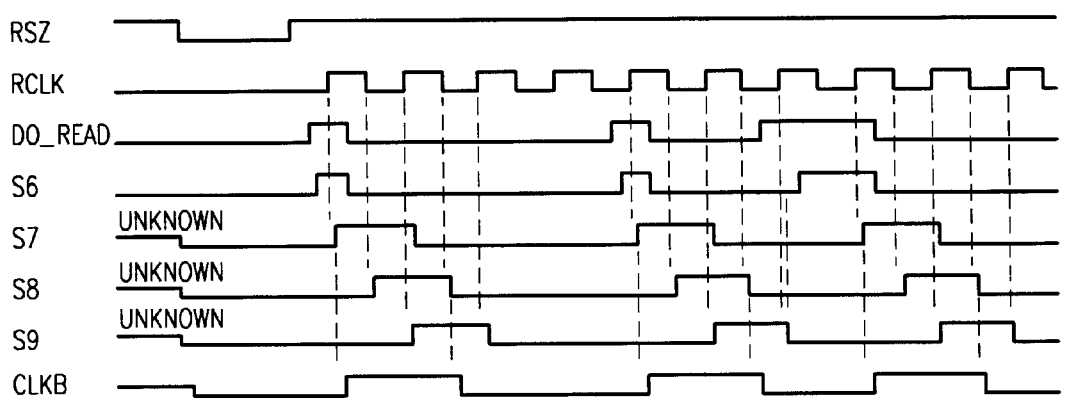
FIG. 7 is a timing diagram illustrating various signal timing relationships associated with a read clock for the RAM block cells and RAM control circuit shown in FIGS. 3 and 4 respectively.

The logic to generate CLKB 332 can be seen to include clocked flip-flops 418, 420, transparent latch 422, and logic gates 424, 426. This operation differs somewhat from that associated with generation of CLKA 330 described herein above. Rather than functioning in the oneshot mode of CLKA 330, CLKB 332 always goes high in response to the rising edge of RCLK 170 when signal DO_READ 428 is high and a CLKB 332 cycle is not already in progress. CLKB 332 returns low in response to the falling edge of the second cycle of RCLK 170. Thus, the width of the high pulse of CLKB 332 equals roughly 1.5× the RCLK 170 cycle time. At the minimum clock period of 7.5 nsec, this time equals approximately 11.25 nsec. Since RDEN 168 (and DO_READ 428) is usually high every fourth RCLK 170 cycle, a CLKB 332 pulse usually occurs on every fourth RCLK 170 cycle, as does CLKA 330 with WCLK 140. In certain circumstances however, CLKB 332 may need to pulse within less than four RCLK 170 cycles. With the minimum CLKB 332 cycle time requirement of the RAM 302 being 20 nsec, a CLKB 332 pulse can not occur more often than every three RCLK 170 cycles (22.5 nsec). The CLKB 332 cycle starts with S7 (430) and S8 (432) low. If DO_READ 428 is high when RCLK 170 goes high, then S7 (430) goes high which sets CLKB 332 high through logic gate 426. When RCLK 170 returns low, S7 (430) passes through latch 422 to S8 (432). Because S7 (430) is high, S6 (444) is now low. This causes S7 (430) to go low when RCLK 170 returns high the second time. S8 (432) however, stays high until RCLK 170 returns low the second time. When S8 (432) returns low, then CLKB 332 returns low. If DO_READ 428 were to be high when RCLK 170 goes high for the third time, without flip-flop 420 and signal S9 (446), CLKB 332 would return high. Flip-flop 420 prevents this by blocking DO_READ 428 for one more RCLK 170 cycle after S8 (432) and CLKB 332 return low. The foregoing operation is depicted in FIG. 7. FIG. 7 is a timing diagram illustrating various signal timing relationships associated with a read clock 170 for the RAM block cell 300 and RAM control circuit 400 shown in FIGS. 3 and 4 respectively.

Figure 8:
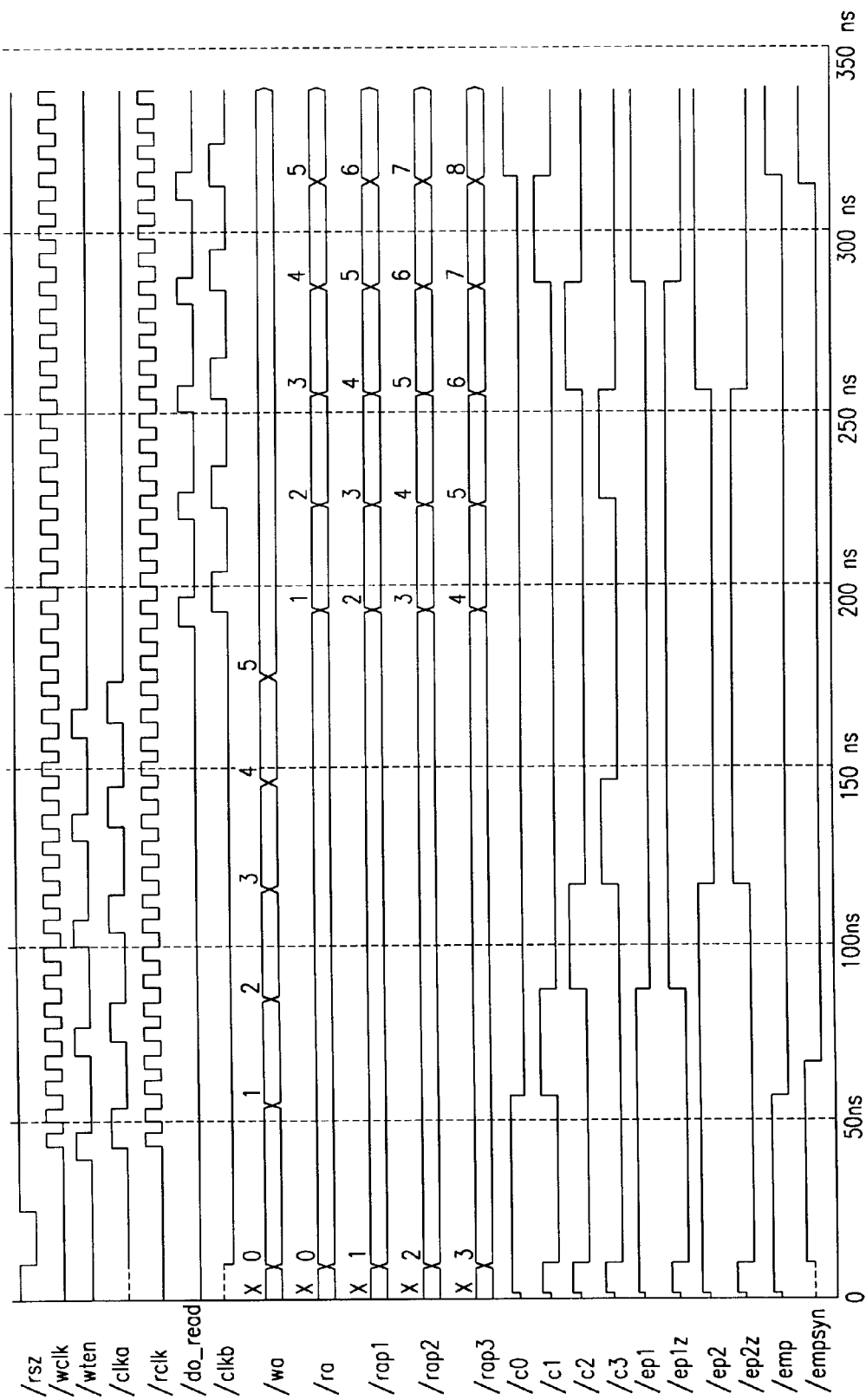
FIG. 8 is a timing diagram illustrating various control signal timing relationships associated with the read clock to provide an indication when all RAM data has been read out (RAM empty), among others.

One of the signals that make up DO_READ 428 is EMPSYN 448 (empty synchronized). When high, EMPSYS 448 indicates that the RAM 302 is empty meaning all RAM 302 data written has been read out. EMPSYS 448 is generated by synchronizing three intermediate asynchronous status flag signals, EMP (empty) 462, EP1 (empty+1) 464, and EP2 (empty+2) 466, through mixes and flip-flops 450–460. The intermediate flags are generated by comparing the write and read addresses 326, 328; and when certain specific differences are present, compare signals C0 (468), C1 (470), C2 (474) and C3 (474) go high. These are used to set and reset the cross-coupled latches 476–482 consisting of gates U10–U13. The write address 326 is the same 10-bit signal that goes to AA of the RAM 302. Signal C3 (474), when high, indicates that write address 326 minus read address 328 equals '3' or that there are three unread words remaining in the RAM 302. Signal C2 (472), when high, indicates that write address 326 minus read address 328 equals '2'. Signals C1 (470) and C0 (468) function in a similar manner. The equation for C3 (474) can be written as WA=RA+3. The equation for C2 (472) can be written as WA=RA+2. Thus, C3 (474) is generated by comparing WA and RAP3 (RA+3) for equality. To generate all the compare signals, values of RAP3 (RA+3), RAP2 (RA+2), RAP1 (RA+1), and RA are needed. RAP3 is generated by a counter consisting of register 484 and incrementer 486. When RSZ 136 is low, register 484 is preset to '3'. Every time a CLKB 332 pulse occurs, the output of register 484 increments and therefore always equals RA+3. This value is clocked by CLKB 332 through three more registers 488, 490, 492 consisting of U40, U39 and U38, which are preset to the values of '2', '1' and '0' to generate signals RAP2, RAP1 and RA. Signal RA is also sent to the RAM 302 as signal AB. This operation is shown in FIG. 8. FIG. 8 is a timing diagram illustrating various control signal timing relationships associated with the read clock 328 to provide an indication when all RAM 302 data has been read out (RAM empty), among others. All the foregoing counters most preferably operate using a GRAY-CODE counting sequence. A more detailed description of this type of synchronized status flag operation is disclosed in U.S. Pat. No. 5,274,600, entitled First-in First-out Memory, issued Dec. 28, 1993 to Ward, et al., and assigned to the assignee of the present invention. The '274 patent is incorporated by reference herein in its entirety.

Figure 9:
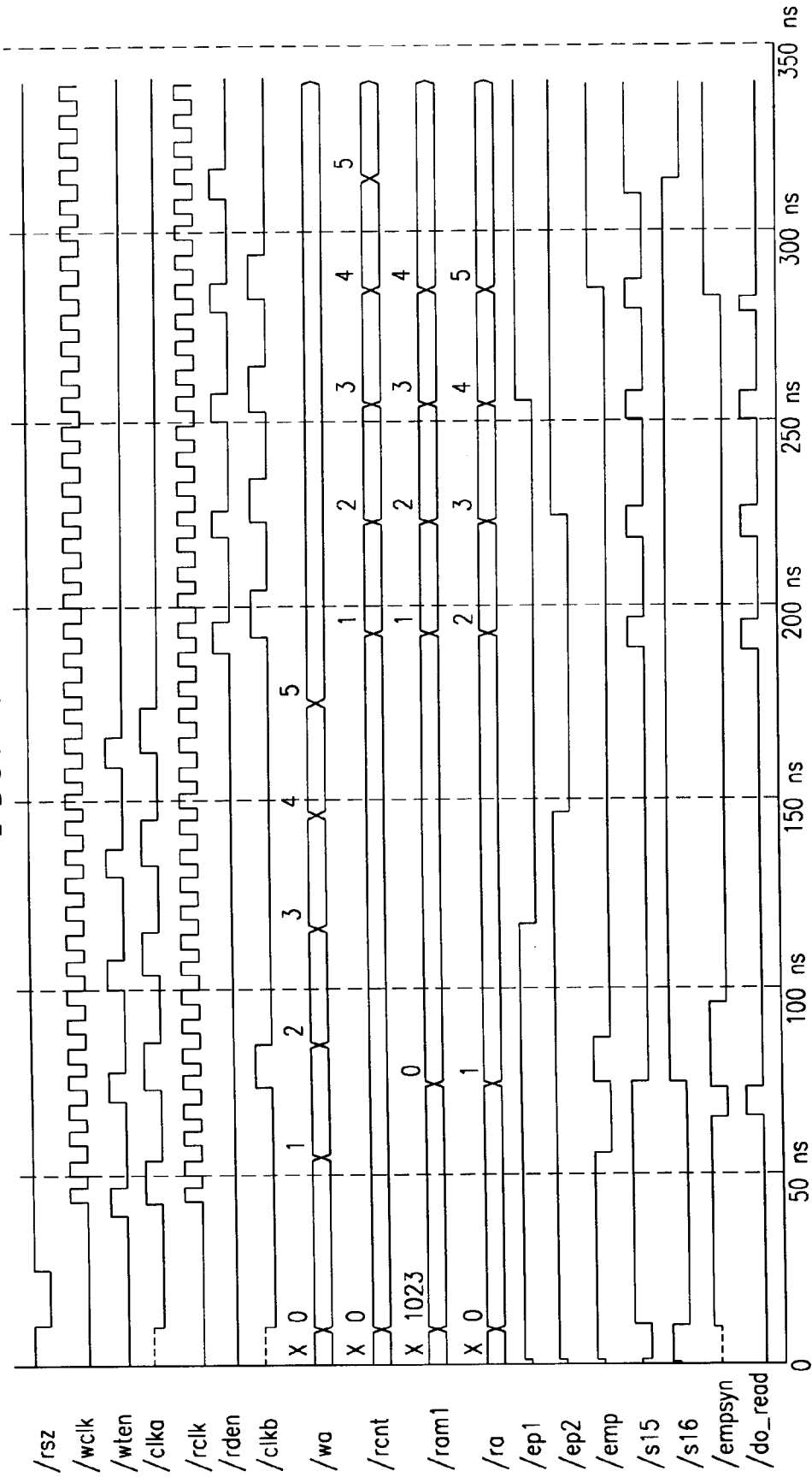
FIG. 9 is another timing diagram illustrating various control signal timing relationships associated with the read clock.
Figure 10A:
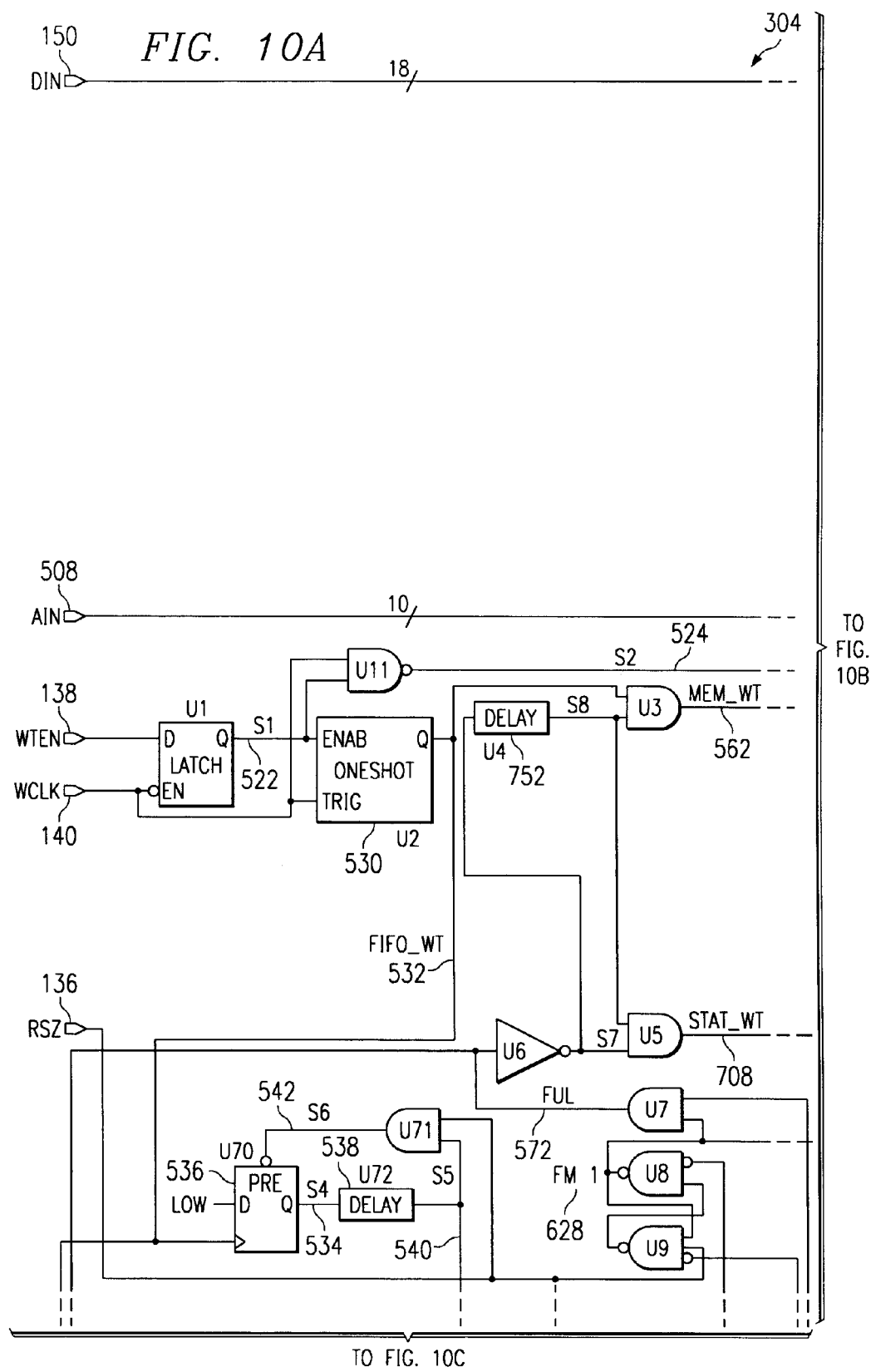
FIG. 10 is a schematic diagram illustrating the small FIFO portion of the RAM block (RAM_BLK) cells shown in FIG. 1.
Figure 10B:
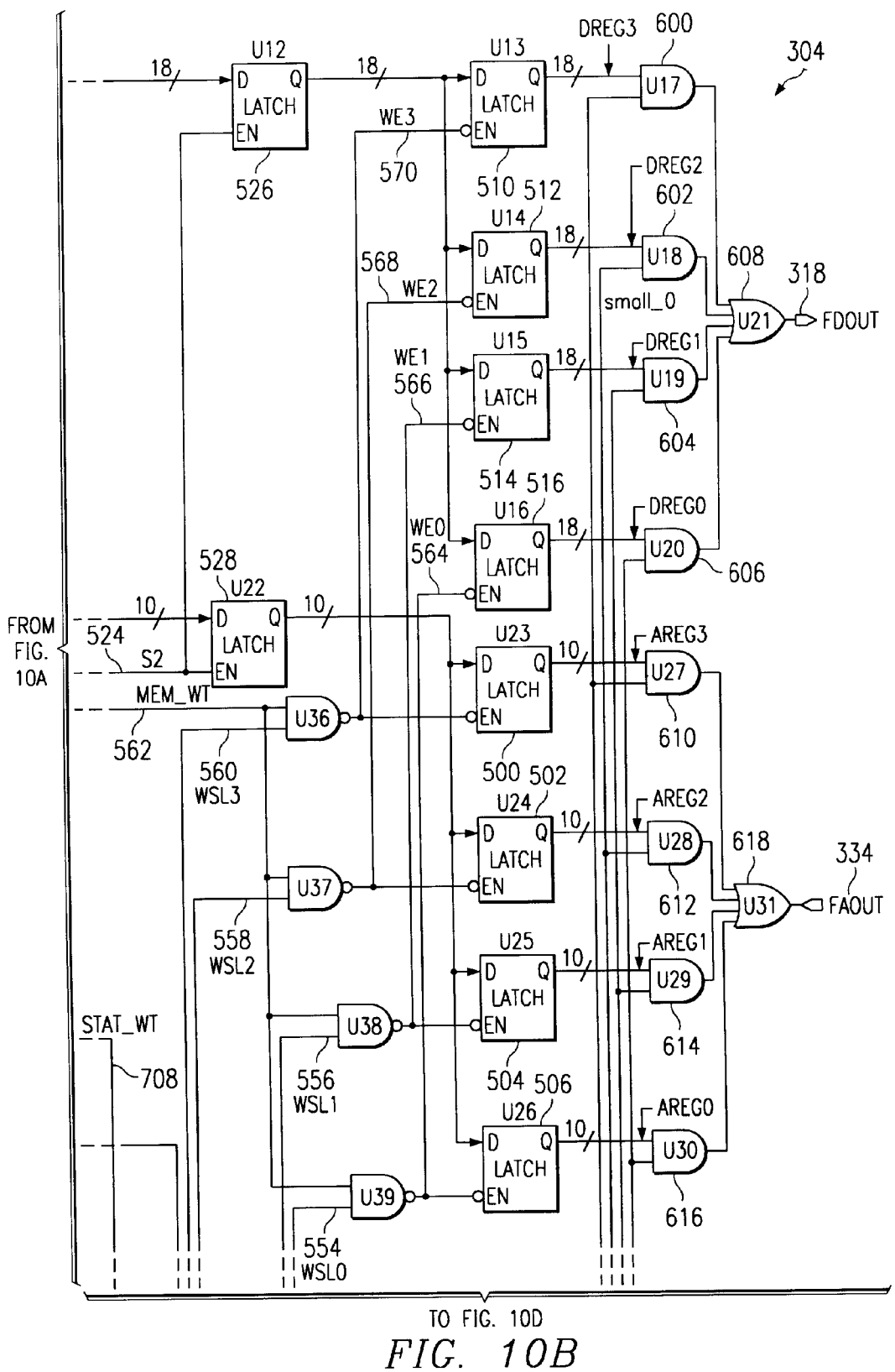
Figure 10C:
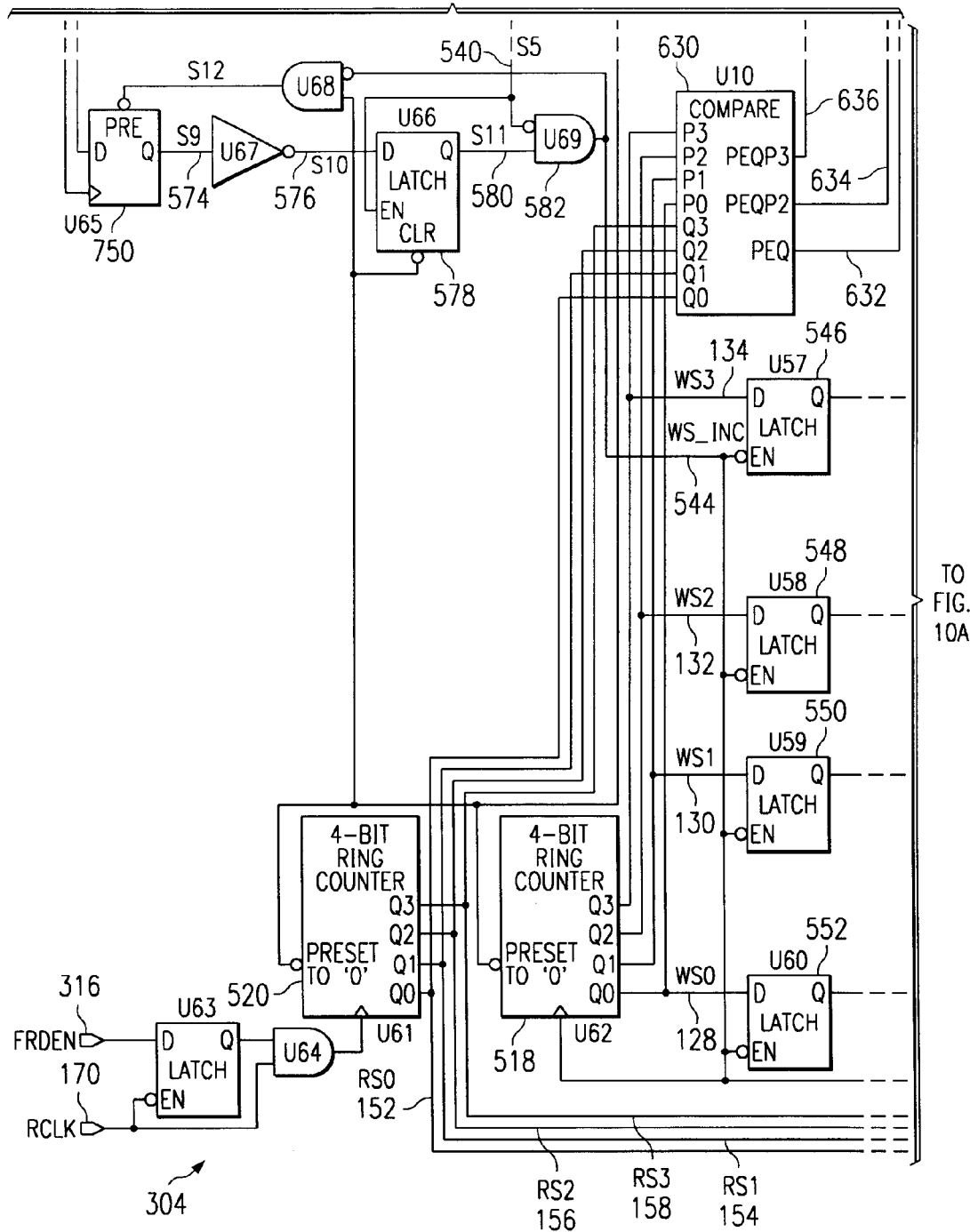
Figure 10D:
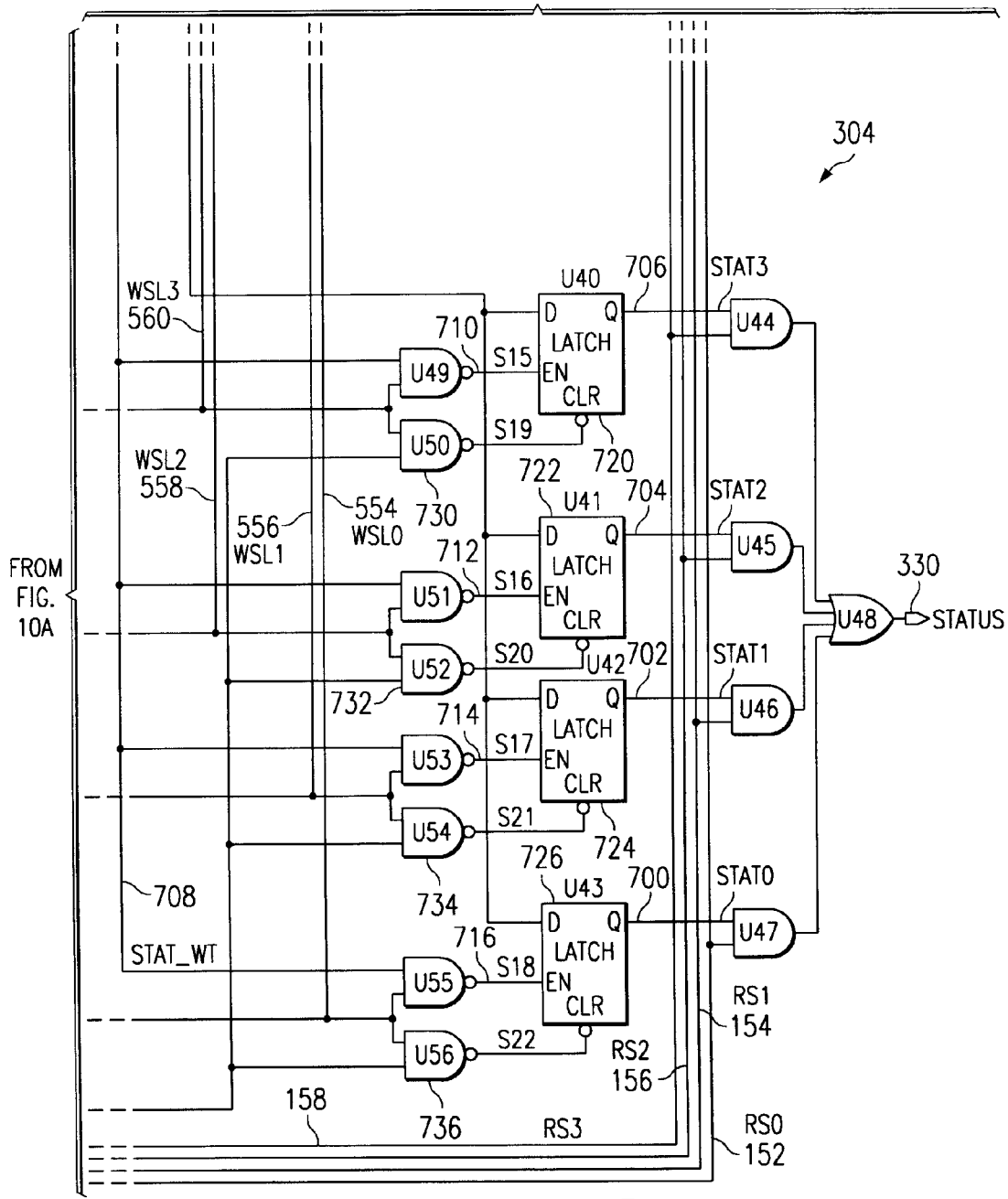

The other signal that makes up DO_READ 428 is S15 (494), which is a combination of RDEN 168 and S16 (496). When a read occurs, the current value on QOUT 320 of the current RAM_BLK 102–108 is clocked to the FIFO 304 output register and is no longer needed. Thus, when RDEN 168 is high, and if EMPSYN 448 is low, indicating there is at least one valid RAM 302 word which has been unread, then DO_READ 428 is set high and a CLKB 332 cycle is initiated. Register U33 (495) and GRAY-CODE incrementer U32 (496) make a counter that generates 10-bit signal RCNT 498 which represents the number of reads that have occurred from this RAM_BLK 300, which is not necessarily the same as RA 401. RCNT 498 gets preset to '0' when RSZ 136 is low. When RSZ 136 is high, and RDEN 168 is high when RCLK 170 goes high, RCNT 498 is incremented. The logic of DO_READ 428 functions to keep the latest unread RAM 302 data on the RAM QB outputs 340. RA 401 represents the RAM 302 address of the next word to appear on QB 340 of the RAM 302 after CLKB 332 goes high. RCNT 498 represents the RAM 302 address of the next word to be clocked into the FIFO 304 output register, which has to already be sitting on RAM QB 340 when RDEN 168 goes high. Thus, to keep the latest unread word on QB 340, RAM 302 reads must occur automatically until RA=RCNT+1. This can be re-written as RA−1=RCNT. Thus, an additional register U37 (403) is used to generate RAM1 (RA−1) from RA 401. The two addresses are compared in U31 (405) and the result of the compare is S16 (496). Therefore, so long as EMPSYS 448 is low, meaning RAM 302 is not empty, DO_READ 428 goes high any time RDEN 168 is high or RAM1 does not yet equal RCNT 498. This operation is depicted in FIG. 9 which is another timing diagram illustrating various control signal timing relationships associated with the read clock RCLK 170.

As stated above, signal GET_MEM 324 determines whether RAM 302 or SMALL_FIFO 304 data is sent to the QOUT port 320. When the SMALL_FIFO is not full, data written to the current RAM_BLK 102–108 is written into the SMALL_FIFO 304 as well as the RAM 302. The write address is also written to the SMALL_FIFO 304 along with the data. The last unread word that has been written to the SMALL_FIFO 304 appears on the SMALL_FIFO 304 FDOUT port 318, and its corresponding address, on FAOUT 334. If this address matches the current value of RCNT 498, then signal S17 (407) from comparator U30 (409) is high which sets GET_MEM 324 low. This causes the SMALL_FIFO 304 data output to be selected for QOUT 320. The next time RDEN 168 is high and a read occurs, FRDEN 316 is set high also, which causes a read from the SMALL_FIFO 304. This flushes out the current data replacing it with the next, and frees up an empty location for the next data write. Essentially, any time FAOUT 334 matches RCNT 498 and a read occurs from this RAM_BLK 302, then GET_MEM 324 goes low, FDOUT 318 is chosen for QOUT 320, FRDEN 316 goes high, and a SMALL_FIFO 304 read occurs. There is however, one exception that occurs when signal STATUS 330 is high, and which is described herein below with reference to FIG. 10.

FIG. 10 is a schematic diagram illustrating the small FIFO 304 portion of the RAM block (RAM_BLK) cells 102–108 shown in FIG. 1. The data received at DIN 150 is stored in latches U13–U16 (510–516), each of which comprises an 18-bit register. The address AIN 508 is stored in latches U23–U26 (500–506), each of which comprises a 10-bit register. Thus, a word in the SMALL_FIFO 304 consists of 18-bits of data and a 10-bit address. The SMALL_FIFO 304 write address is generated by ring-counter U62 (518). The read address is generated by ring-counter U61 (520). If WTEN 138 is high when WCLK 140 goes high, then signal S1 (522) gets latched high. While SCLK 140 remains high, this causes signal S2 (524) to be low and therefore latches DIN 150 and AIN 508 in latches U12 (526) and U22 (528) throughout the write cycle. This same WCLK 140 transition while S1 (522) is high triggers oneshot U2 (530) to produce a highgoing pulse on signal FIFO_WT (532). The width of the FIFO_WT pulse (532) is narrower than the minimum high time of WCLK 140, so any operation caused by FIFO_WT (532) is finished before WCLK 140 returns low, which re-enables latches U12 (526) and U22 (528). The FIFO_WT pulse 532 also triggers a longer low-going oneshot pulse on signal S4 (534). FIFO_WT 532 clocks a low into flip-flop U70 (536), which causes S4 (534) to go low. Delay U72 (538) delays this low transition by approximately 12 nsec to create signal S5 (540). This delayed low level sets S6 (542) low which returns S4 (534) high through the PRE input of U70 (536). Thus, a high transition of FIFO_WT 532 causes a low transition on S5 (540) approximately 12 nsec later. Signal S5 (540) then returns high after approximately another 12 nsec.

Figure 11:
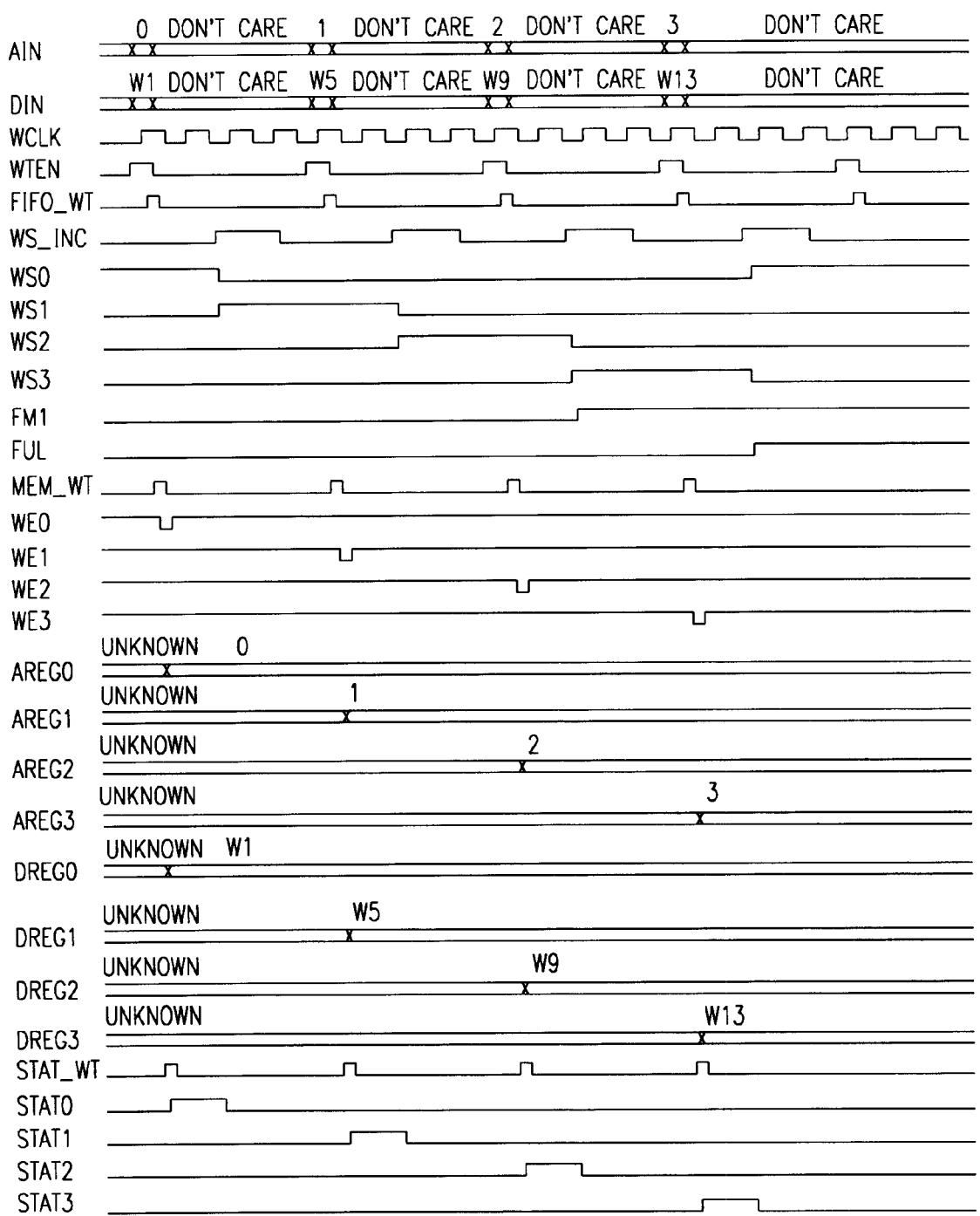
FIG. 11 is a timing diagram illustrating various write signal timing relationships, among others, associated with the small FIFO shown in FIG. 10.

The SMALL_FIFO 304 write address is represented by signals WS0, WS1, WS2 and WS3 (128–134) as stated herein before. Upon a reset of ring-counter U62 (518), signals WS0 (128) is high and WS1 (130), WS2 (132) and WS3 (134) are low. A high transition on WS_INC (544) increments U62 (518) so that the high state on WS0 (128) moves to WS1 (130) and the low on WS3 (134) moves to WS0 (128). Thus, only one output is high at any time and only four states are possible. These four signals (128–134) get passed through latches U57–U60 (546–552) to generate signals WSL0–WSL3 (554–560). If the SMALL_FIFO 304 is not full (signal FUL=low) when FIFO_WT 532 pulses, then a pulse also appears on signal MEM_WT 562. When this pulse appears, the high level on one of WSL0–WSL3 (554–560) causes a low pulse on the corresponding WE0–WE3 (564–570). This enables the selected data latch (U13–U16) 510–516 and address latch (U23–U26) 500–506 and the data and address values in U12 (526) and U22 (528) are written into the registers. Also, if FUL 572 is low, the pulse on FIFO_WT 532 causes signal S9 (574) to go low and S10 (576) to go high. Since S5 (540) is high at this time, latch U66 (578) is enabled and S11 (580) also goes high. After approximately 12 nsec, S5 (540) goes low, which latches the value of S10 (576) onto S11 (580), and signal WS_INC (544) goes high through U69 (582). This latches the values of WS0–WS3 (128–134) onto WSL0–WSL3 (554–560) and simultaneously increments U62 (518). When S5 (540) returns high, WS_INC 544 returns low which completes the increment operation. In summary, if FUL 572 is low when FIFO_WT 532 pulses, the data/address are written; and after about 12 nsec, WS_INC 544 pulses high incrementing counter U62 (518). FIG. 11 is a timing diagram illustrating various write signal timing relationships, among others, associated with the SMALL_FIFO 304 shown in FIG. 10.

Figure 12:
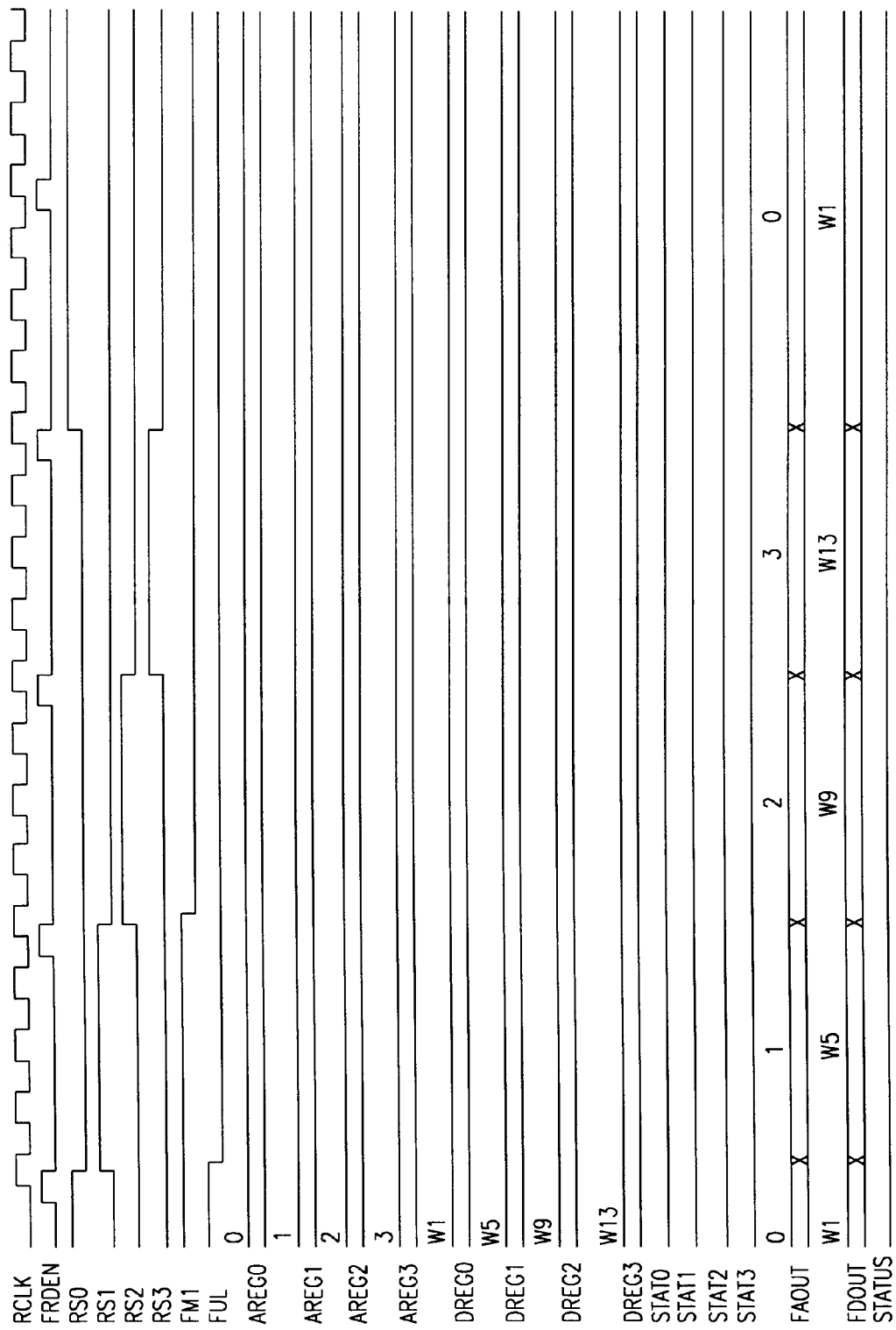
FIG. 12 is a timing diagram illustrating various read signal timing relationships, among others, associated with the small FIFO shown in FIG. 10.

Reading the data and address out of the SMALL_FIFO 304 is accomplished through an 18-bit wide one-of-four data selector comprising gates U17–U21 (600–608) and a 10-bit wide one-of-four data selector comprising gates U27–U31 (610–618). Ring counter U61 (520) operates like U62 (518) to generate the read address comprised of signals RS0, RS1, RS2 and RS3 (620–626). Whichever one of these signals (620–626) is high determines which outputs of data latches 510–516 and address latches 500–506 appear on FDOUT 318 and FAOUT 334. If FRDEN 316 is high when RCLK 170 goes high, then counter U61 (520) is incremented and the next data and address is output on FDOUT 318 and FAOUT 334. The SMALL_FIFO 304 read timing is shown in FIG. 12 which is a timing diagram illustrating various read signal timing relationships, among others, associated with the SMALL_FIFO 304 shown in FIG. 10.

Signals FUL 572 and FM1 (full minus 1) 628 are generated by comparing the write address (WS0–WS3) 128–134 and read address (RS0–RS3) 152–158 for specific differences. Comparator U10 (630) generates difference signals of PEQ (P=Q) 632, PEQP2 (P=Q+2) 634 and PEQP3 (P=Q+3) 636. When RSZ 136 is low, FM1 (628) and FUL 572 are set low. After two SMALL_FIFO 304 writes with no reads, PEQP2 (634) goes high. After one more write, PEQP2 (634) returns low and PEQP3 (636) goes high. This sets FM1 (628) high. After one more write, PEQP3 (636) returns low, PEQ 632 goes high, FM1 (628) stays high, and FUL 572 goes high. After one read, PEQ 632 and FUL 572 return low and PEQP3 (636) goes high. After another read, PEQP3 (636) returns low and PEQP2 (634) goes high. This sets FM1 (628) low. Additional reads empty the SMALL_FIFO 304. The timing associated with FM1 (628) and FUL 572 are also illustrated in FIGS. 11 and 12.

Due to the asynchronous nature of the SMALL_FIFO 304, a FIFO read can occur essentially any time in relation to a SMALL_FIFO 304 write. Since signal FUL 572 is used to decide whether to do a write, and since FUL 572 goes low due to a read, FUL 572 can go low while FIFO_WT 532 is high which can cause a truncated pulse on MEM_WT 562. This can cause an incomplete data/address write to the latches. Some bits may get written and others not. Latching the state of FUL 572 at the start of FIFO_WT 532 is unacceptable because of potential metastability. A two-stage synchronizer could be used as in signal EMPSYN 448 in RAM_CTRL 400, except that once the SMALL_FIFO 304 is full and a read occurs, two WCLK 140 cycles are required to clear the synchronized FUL 572 signal. If the frequency of WCLK 140 is too slow relative to RCLK 170, the FIFO 304 may be empty and the next write must occur in the SMALL_FIFO 304 before the synchronized FUL 572 gets cleared. This limits the RCLK 170 to WCLK 140 frequency ratio to around 8:1 or less. This may be an unacceptable limitation for users of the FIFO 304. A solution is the use of the STATUS output 330.

The remaining logic is used to generate STATUS 330. There are four individual status bits, STAT0–STAT3 (700–706), one for each data/address word. Like the data and address, they are written when FUL 572 is low and FIFO_WT 532 pulses. This pulses signal STAT_WT 708 high and the corresponding latch enable (S15–S18) 710–714 low, thus enabling the latch. STAT0–STAT3 (700–706) are read out in the same way the data/address words are read out. A high level on one of the bits indicates that the data/address stored in that corresponding word may have not been written properly and therefore must not be used. If all other words are read from the SMALL_FIFO 304 and this word appears at FDOUT 318 and FAOUT 334, then STATUS 330 is high and signal GET_MEM 324 in RAM_CTRL 400 will not go low, FDOUT 318 will not be selected for output, and no SMALL_FIFO 304 read will occur. The SMALL_FIFO 304 will be considered empty.

When the RAM_BLK 300 is empty, the first word written must be available to be read out in a very short amount of time. If the RAM_BLK 300 is empty, then the SMALL_FIFO 304 is also empty. Therefore, this first word is written to the SMALL_FIFO 304 and automatically appears on FDOUT 318 and its corresponding address on FAOUT 334. In this case, FAOUT 334 will match RCNT 498 in RAM_CTRL 400 and signal GET_MEM 324 must go low which allows the FDOUT 318 to be selected for output. Therefore, the status bit 330 must also be written low at this time.

If the SMALL_FIFO 304 is not empty, but not yet full, then the data/address are guaranteed to have been properly written, and therefore, the status bit is written low. This is accomplished by using FM1 (628) as the data for status latches U40–U43 (720–726). When there are two or fewer words in SMALL_FIFO 304, then FM1 (628) is low and a low is written into the status bit 330. As writes occur with three words in the SMALL_FIFO 304, FM1 (628) is high so the status bit 330 gets written high. Since WS_INC 544 however, goes high approximately 12 nsec later, the status bit 330 gets cleared through gate U50 (730), U52 (732), U54 (734), or U56 (736). If FM1 (628) is just going low due to a SMALL_FIFO 304 read when FIFO_WT 532 pulses, then the status bit 330 may go metastable and could end up in an unknown state. This too, however, will later be set low when WS_INC 544 goes high. If there are four words stored in the SMALL_FIFO 304, FUL 572 is high and no SMALL_FIFO 304 write occurs at all when FIFO_WT 532 pulses.

During SMALL_FIFO 304 writes, FUL 572 is normally low. If FUL 572 is high but goes low around the same time that FIFO_WT 532 pulses, various scenarios are possible. If FUL 572 goes low early enough before FIFO_WT 532 pulses, all signals behave as previously described for a low state of FUL 572. As the low transition of FUL 572 happens later relative to FIFO_WT 532, the first signal to be affected is S9 (574) because of the fairly long set-up time of U65 (750). Signal S9 (574) will fail to go low on FIFO_WT 532 and therefore WS_INC 544 will not pulse high and U62 (518) will not increment. The data/address will be written properly and status bit 330 will be set high; but since WS_INC 544 does not go high, the status bit 330 is not cleared. Thus, the data/address will be treated as invalid. If FUL 572 goes low just as FIFO_WT 532 goes high and the set-up time for U65 (750) is not met, U65 (750) may go metastable and S9 (574) may get stuck in an indeterminate state. Since, however, S9 (574) is not sampled in U66 (578) until approximately 12 nsec later, it is virtually guaranteed to have resolved to high or low by that time. Using metastability measurements for the current process technology, the present inventors have estimated an MTBF to be at least several thousand years.

As the low transition on FUL 572 happens still later relative to FIFO_WT 532, the rising edge of MEM_WT 562 starts to happen later. Since the falling edge of MEM_WT 562 happens due to the falling edge of FIFO_WT 532, the pulse width on MEM_WT 562 gets narrower as the low transition on FUL 572 happens later until the minimum pulse width on registers U13–U16 (510–516) and U23–U26 (500–506) fail to be met and the data and address fail to be properly written. Because of delay U4 (752), this pulse narrowing happens sooner on MEM_WT 562 than on STAT_WT 708. Thus, though the data and address may fail to be written properly, the status bits are set high so that the data/address are ignored in RAM_CTRL 400. As the low transition on FUL 572 happens still later relative to FIFO_WT 532, MEM_WT 562 will not pulse at all and the data/address retain their old values and it is as if no SMALL_FIFO 304 write has occurred at all. The status bit 330 may still be set, but will not matter in RAM_CTRL 400 because FAOUT 334 is the address of a word that has already been removed from the SMALL_FIFO 304 and therefore will not match RCNT 498. As the low transition on FUL 572 happens still later relative to FIFO_WT 532, STAT_WT 708 will not pulse at all and no SMALL_FIFO 304 write events will occur. The foregoing described scenarios are depicted in FIGS. 13–24 which are timing diagrams illustrating multiple signal timing relationships associated with various FIFO write events for the SMALL_FIFO 304 shown in FIG. 10. In each timing diagram, the signal DATA_ADDR represents the combination of the data and address registers of the particular SMALL_FIFO 304 word being written to. The signal STATUS represents the status bit of the particular word being written to, and not the actual STATUS 330 output.

Figure 13:
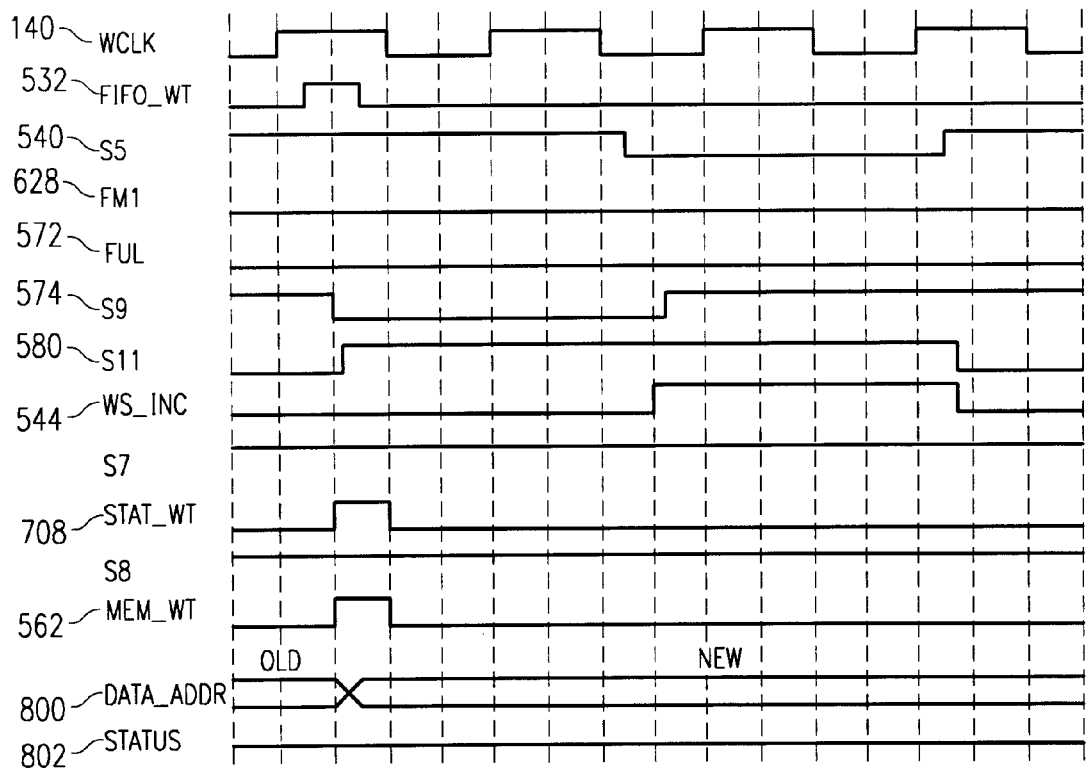
FIGS. 13–24 are timing diagrams illustrating multiple signal timing relationships associated with various small FIFO write events for the small FIFO shown in FIG. 10.

FIG. 13 shows that FM1 (628) and FUL 572 are low when FIFO_WT 532 pulses. Signal S9 (574) can be seen to be clocked low so that when S5 (540) goes low, S11 (580) is latched high and WS_INC 544 pulses. MEM_WT 562 and STAT_WT 708 are full-width pulses so data/address are written properly; and since FM1 (628) is low, status bit 802 stays low. WS_INC 544 increments the write counter and returns S9 (574) to high.

Figure 14:
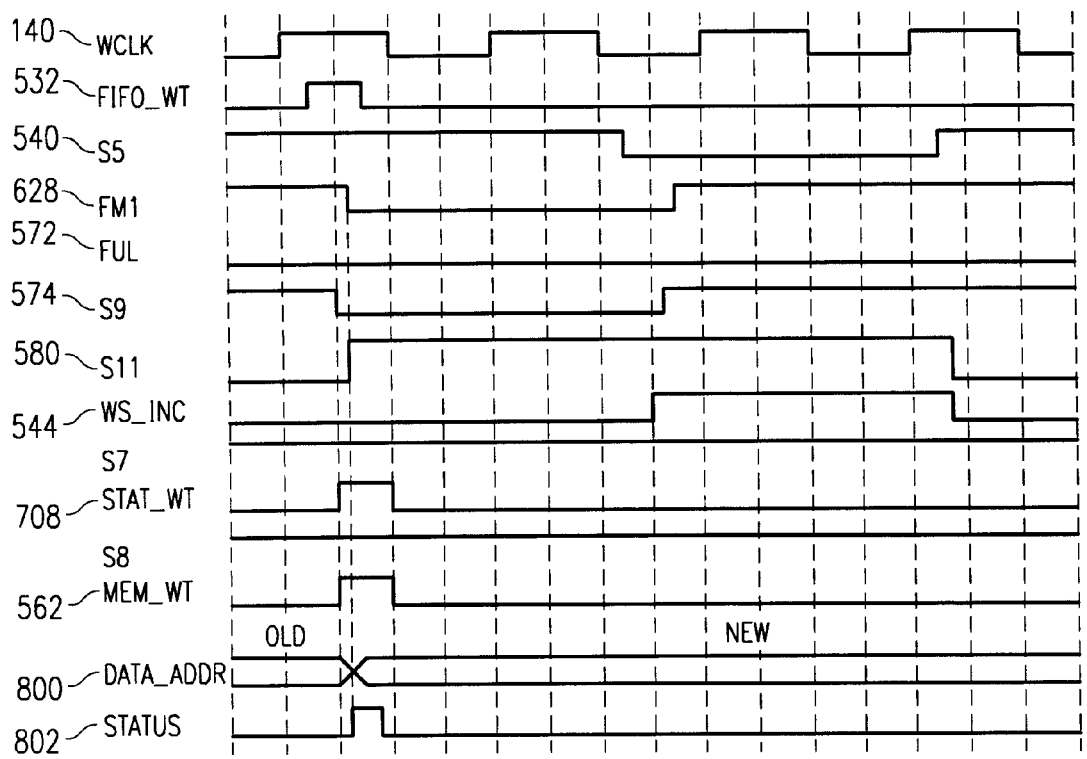

FIG. 14 shows that FUL 572 is low and FM1 (628) starts high when FIFO_WT 532 pulses. Signal S9 (574) is clocked low so when S5 (540) goes low, S11 (580) is latched high and WS_INC 544 pulses. MEM_WT 562 and STAT_WT 708 are full-width pulses so data/address are written properly. FM1 (628) goes low due to a SMALL_FIFO 304 read before STAT WT 708 pulse finishes; so status bit 802 resolves to low. WS_INC 544 returns S9 (574) to high and increments the write counter, returning FM1 (628) to high.

Figure 15:
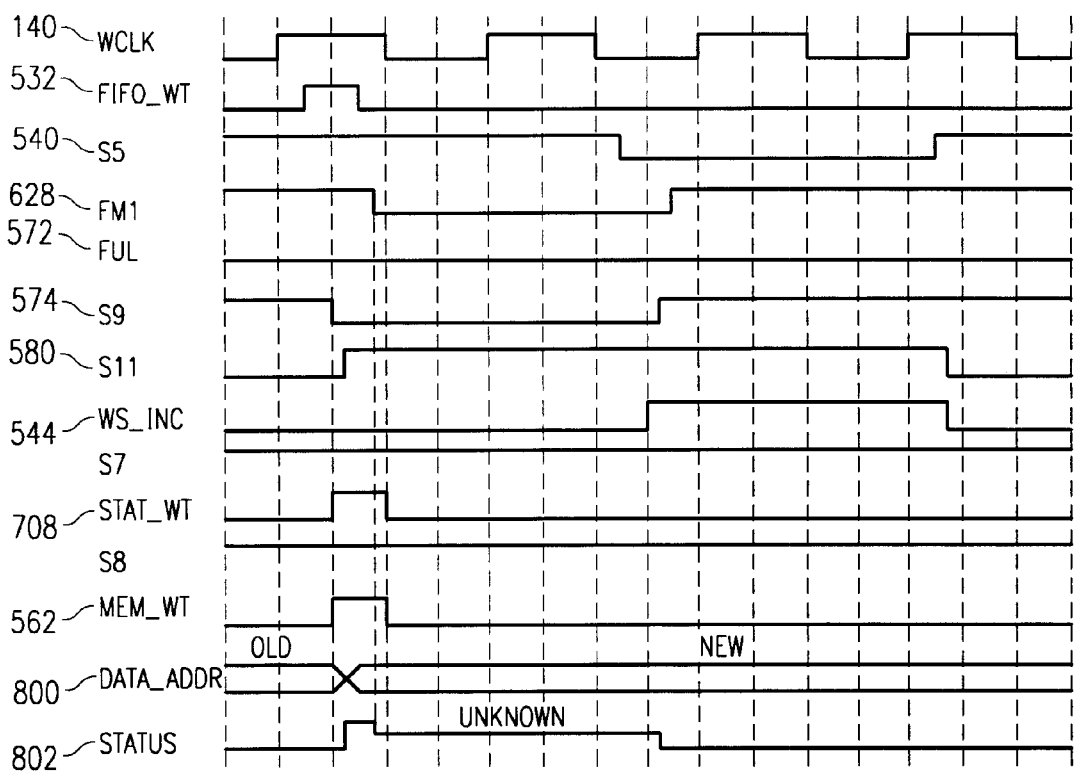

Looking now at FIG. 15, FUL 572 is low and FM1 (628) starts high when FIFO_WT 532 pulses. Signal S9 (574) is clocked low so when S5 (540) goes low, S11 (580) is latched high and WS_INC 544 pulses. MEM_WT 562 and STAT_WT 708 are full-width pulses so data/address are written properly. FM1 (628) goes low due to a SMALL_FIFO 304 read just as STAT_WT 708 pulse finishes, failing set-up time for the status latch. Status bit 802 goes metastable (unknown), but WS_INC 544 clears it, returns S9 (574) to high, and increments the write counter, returning FM1 (628) to high.

Figure 16:
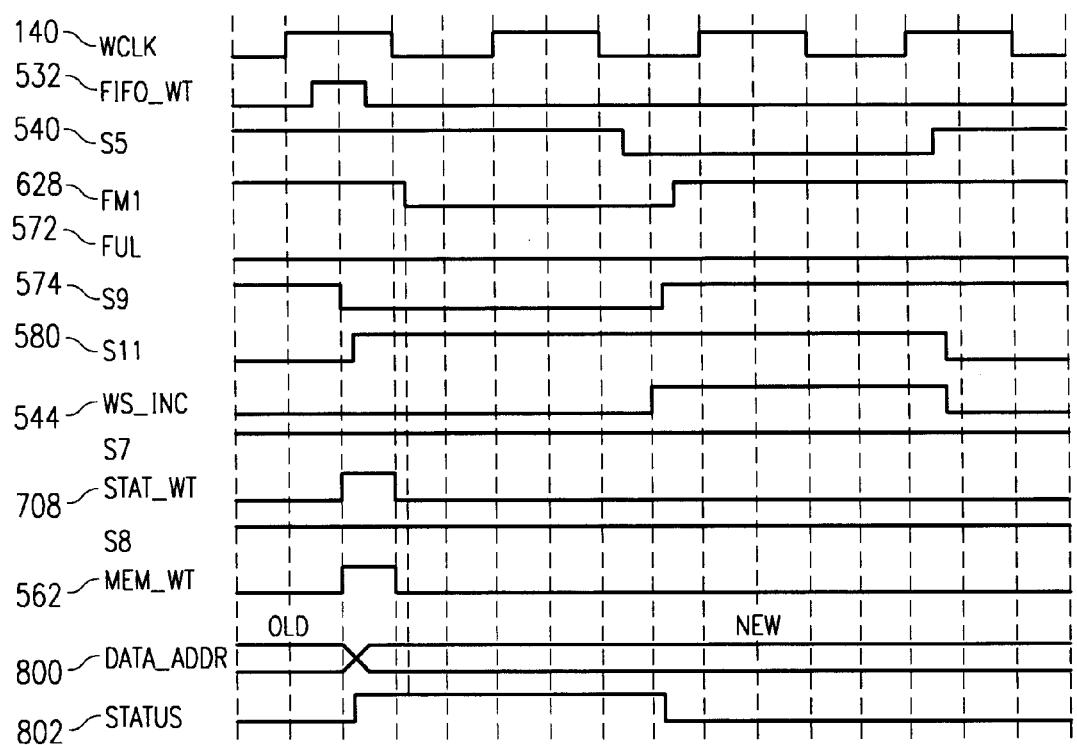

With reference to FIG. 16, FUL 572 is low and FM1 (628) starts high when FIFO_WT 532 pulses. Signal S9 (574) is clocked low so that when signal S5 (540) goes low, signal S11 (580) is latched high, and WS_INC 544 pulses. MEM_WT 562 and STAT_WT 708 are full-width pulses so data/address are written properly. FM1 (628) goes low due to a SMALL_FIFO 304 read after the STAT_WT 708 pulse finishes, writing a high into the status latch 802. WS_NC 544 clears the status latch 802, returns S9 (574) to high, and increments the write counter returning FM1 (628) to high.

Figure 17:
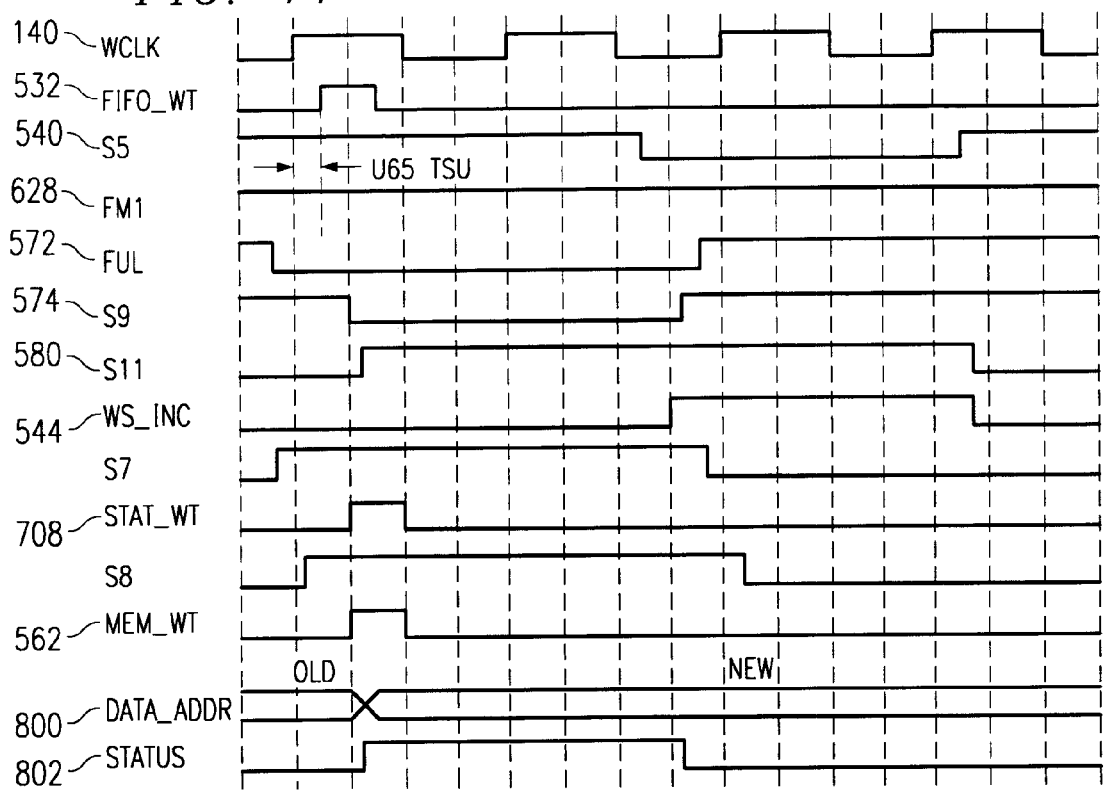

The scenarios discussed herein below with reference to FIGS. 17–24 are set forth with the understanding that signal FM1 (628) remains in its high state (does not switch low) during the described switching cycles. In FIG. 17, FUL 572 starts out high but goes low due to a SMALL_FIFO 304 read in time to meet the set-up time of U65 (750) relative to FIFO_WT 532, so S9 (574) is clocked low. Since S9 (574) is clocked low when S5 (540) goes low, S11 (580) is latched high and WS_INC 544 pulses. MEM_WT 562 and STAT_WT 708 are full-width pulses so data/address are written properly and the status bit 802 is set high. WS_INC 544 clears the status latch, returns S9 (574) to high, and increments the write counter returning FUL 572 to high.

Figure 18:
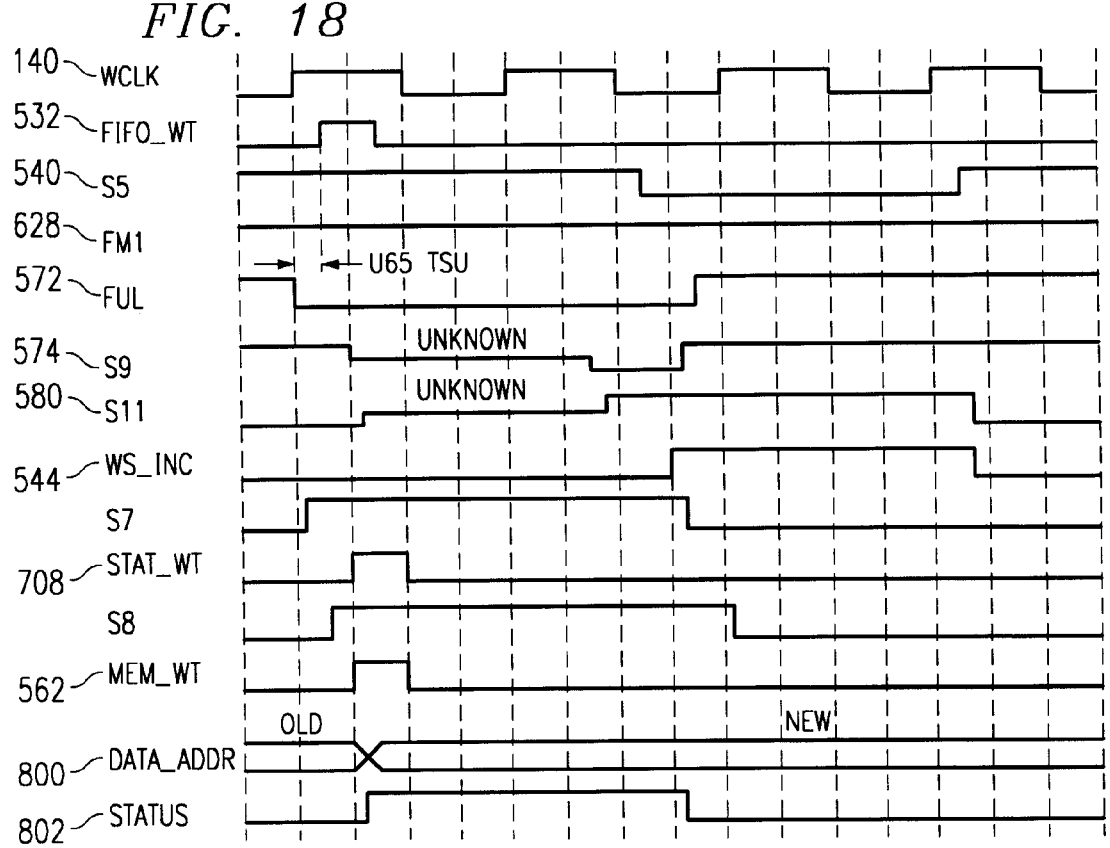

FIG. 18 shows that FUL 572 starts out high and goes low, but not in time to meet the set-up time of U65 (750) relative to FIFO_WT 532. Signal S9 (574) goes metastable, but resolves to low before S5 (540) goes low. Since S9 (574) is low when S5 (540) goes low, S11 (580) is latched high and WS_INC 544 pulses. MEM_WT 562 and STAT_WT 708 are full-width pulses, so data/address are written properly and the status bit 802 is set high. WS_INC 544 clears the status latch, returns S9 (574) to high, and increments the write counter returning FUL 572 to high.

Figure 19:
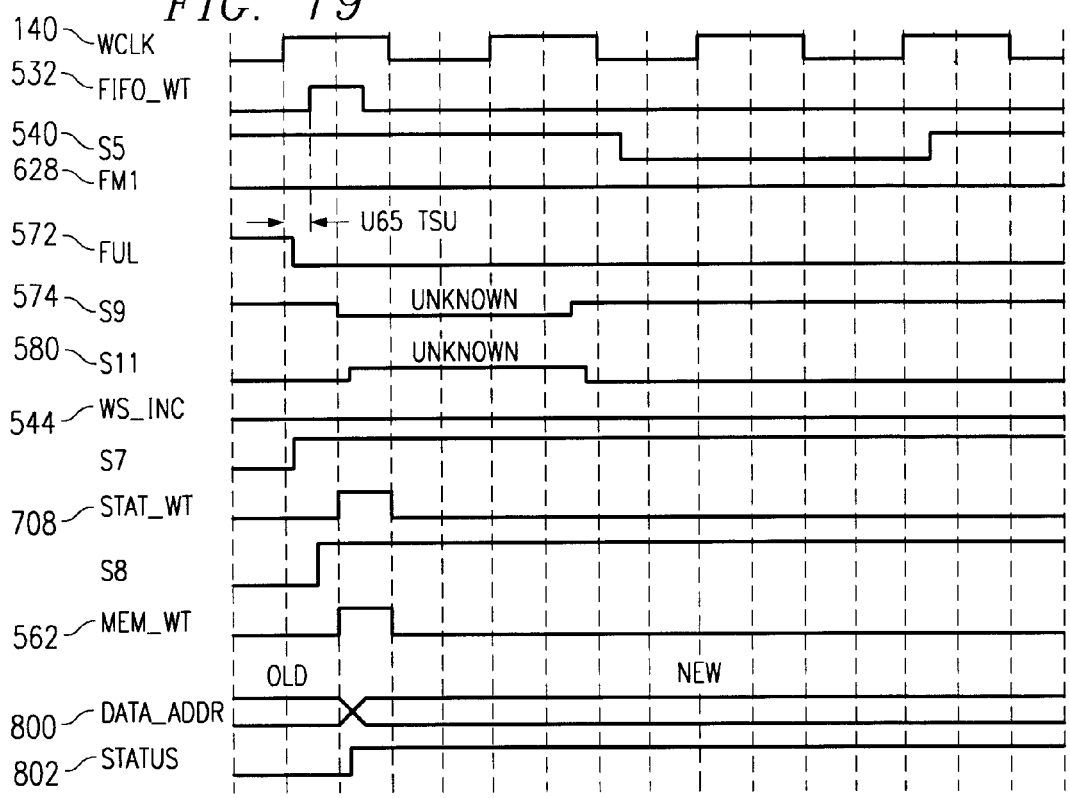

FIG. 19 shows that FUL 572 starts out high and goes low, but not in time to meet the set-up time of U65 (750) relative to FIFO_WT 532. Signal S9 (574) goes metastable, but resolves to high before S5 (540) goes low. Since S9 (574) is high when S5 (540) goes low, S11 (580) is latched low so WS_INC 544 does not pulse. MEM_WT 562 and STAT_WT 708 are full-width pulses so data/address are written properly and the status bit 802 is set high. Since WS_INC 544 does not pulse, the write counter is not incremented and the status bit 802 remains high causing RAM_CTRL 400 to ignore this word.

Figure 20:
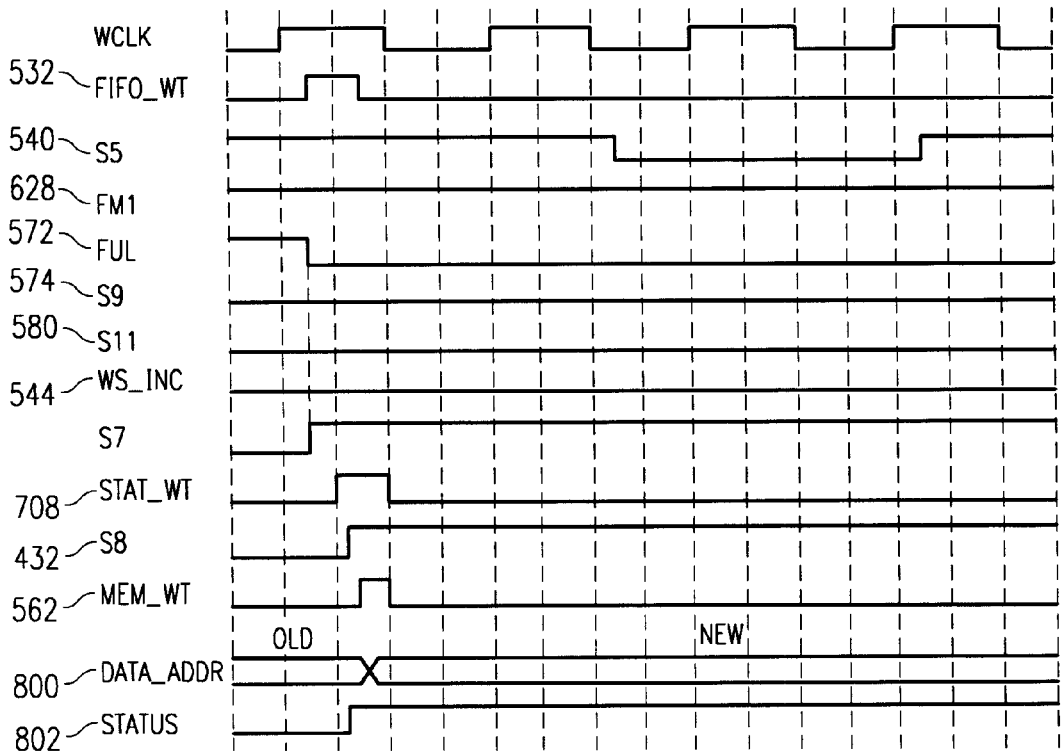

FIG. 20 shows that FUL 572 starts out high and goes low too late for S9 (574) to go low, so WS_INC 544 does not pulse. STAT_WT 708 is a full-width pulse so the status bit 802 is set high. FUL 572 is now late enough so that S8 (432) goes high after FIFO_WT 532 begins. Therefore, the width of the MEM_WT 562 pulse is truncated, but is still wide enough so data/address are written properly. However, since the status bit 802 is high, RAM_CTRL 400 will ignore this word.

Figure 21:
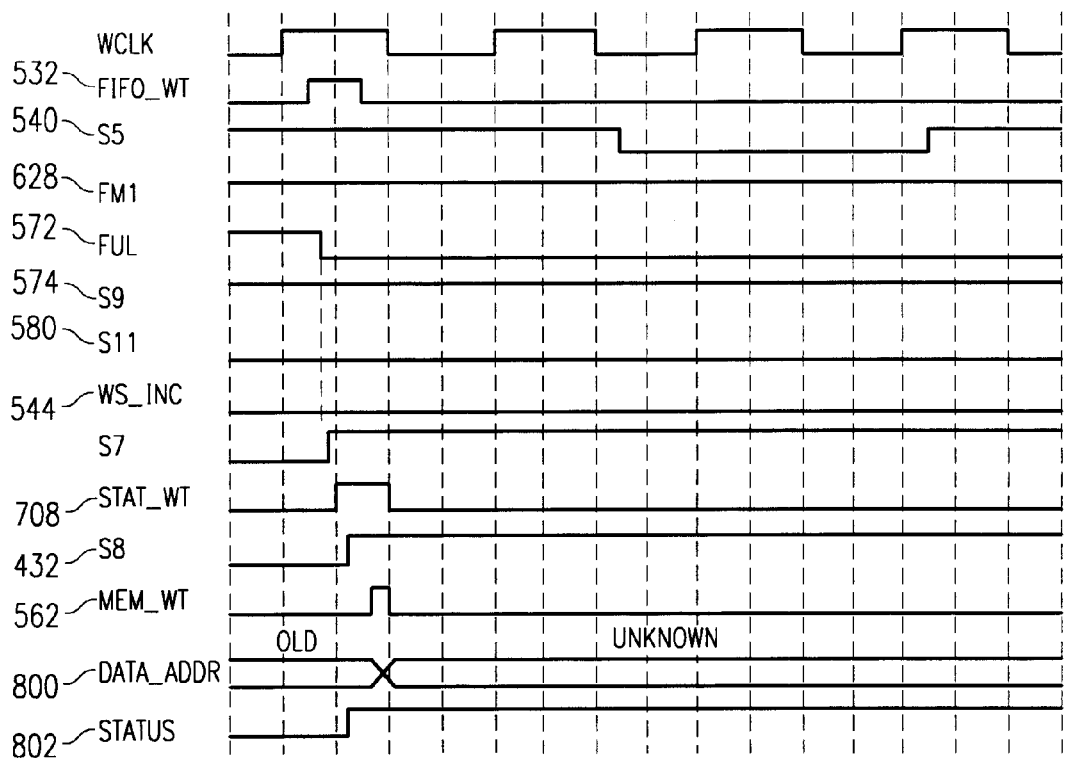

FIG. 21 shows that FUL 572 starts out high and goes low too late for S9 (574) to go low, so WS_INC 544 does not pulse. STAT_WT 708 is a full-width pulse so the status bit 802 is set high. FUL 572 is now late enough so that S8 (432) goes high after FIFO_WT 532 begins. Therefore, the width of the MEM_WT 562 pulse is truncated, and is too narrow to meet the minimum pulse width required by the data/address latches. The data/address will thus go unknown. Since the status bit 802 is high however, RAM_CTRL 400 will ignore this word.

Figure 22:
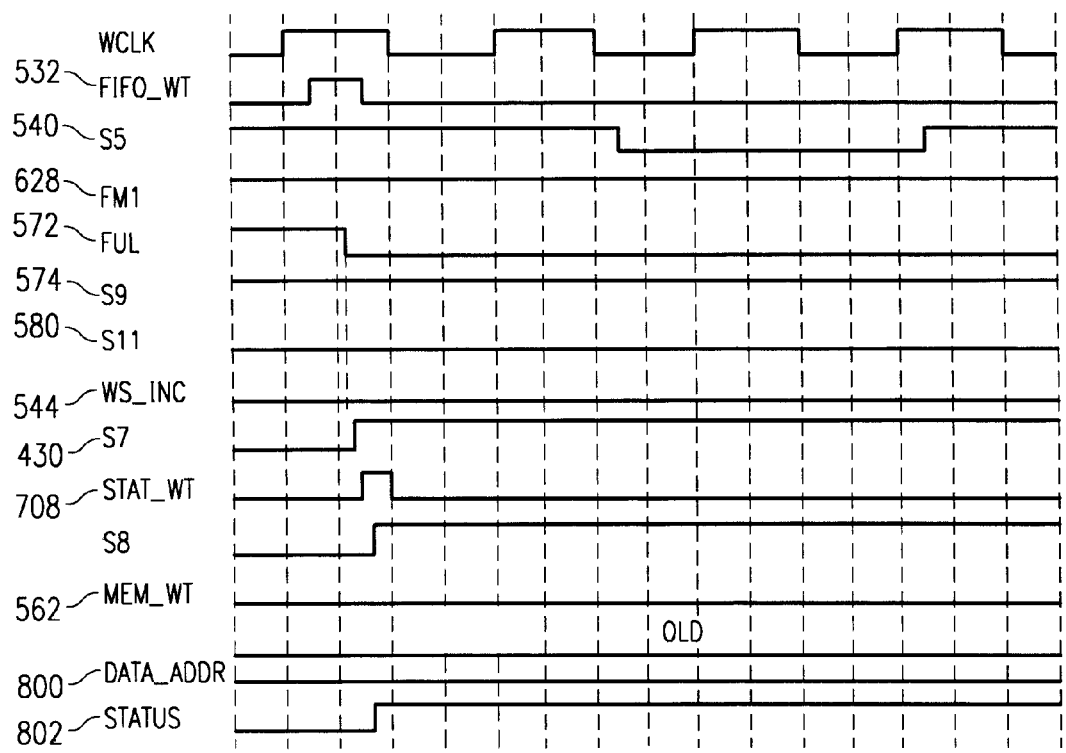

FIG. 22 shows that FUL 572 starts out high and goes low too late for S9 (574) to go low, so WS_INC 544 does not pulse. FUL 572 is now late enough so no pulse at all appears on MEM_WT 562. Therefore, the old data/address remain in the latches. FUL 572 is also late enough so S7 (430) goes high after FIFO_WT 532 begins; so the width of STAT_WT 708 is truncated. STAT_WT 708 is still wide enough to write a high to the status bit 802, so RAM_CTRL 400 will ignore this word.

Figure 23:
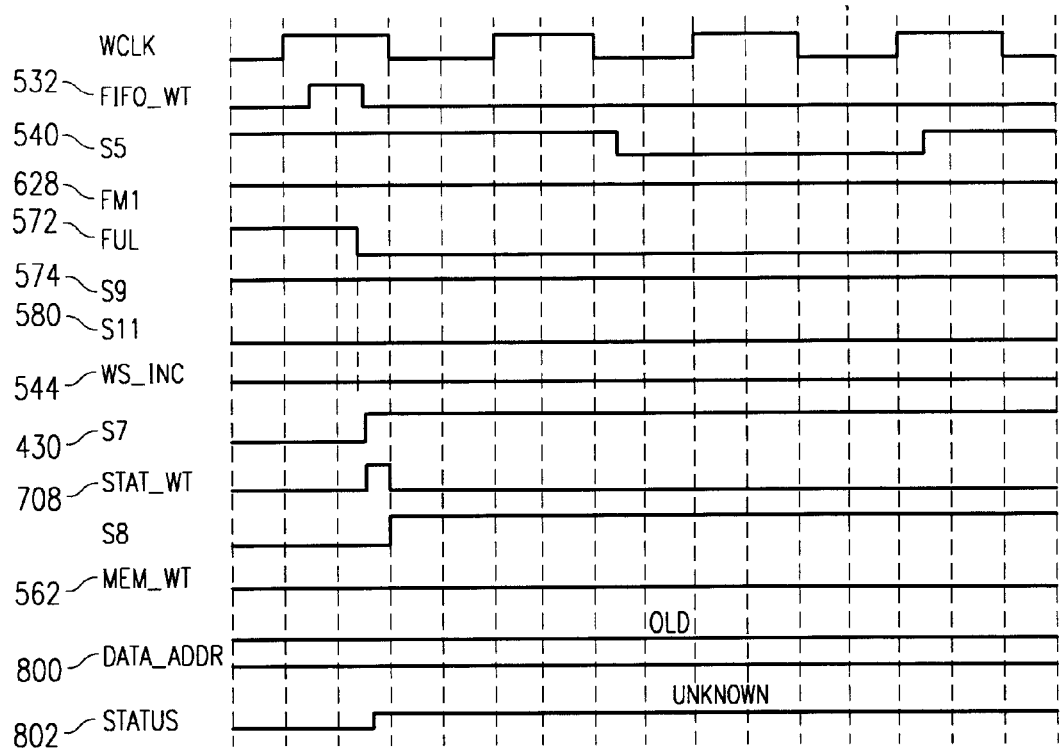

FIG. 23 shows that FUL 572 starts out high and goes low too late for S9 (574) to go low, so WS_INC 544 does not pulse. FUL 572 is now late enough so no pulse at all appears on MEM_WT 562. Therefore, the old data/address remain in the latches. FUL 572 is also late enough so S7 (430) goes high after FIFO_WT 532 begins; so the width of STAT_WT 708 is truncated enough to fail the minimum pulse width required by the status latch. Therefore, the status bit 802 goes unknown. This word however, will be ignored in RAM_CTRL 400 because the old address is still present and the SMALL_FIFO 304 is seen as empty.

Figure 24:
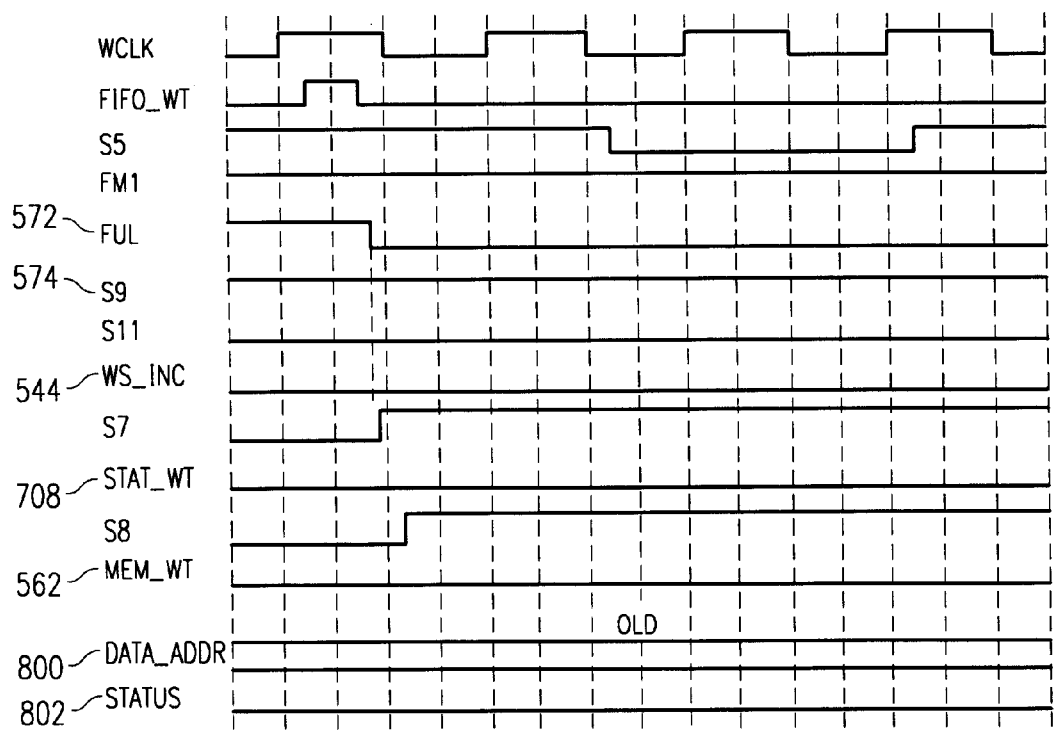

FIG. 24 shows that FUL 572 starts out high and goes low too late for S9 (574) to go low, so WS_INC 544 does not pulse. FUL 572 is now late enough so no pulse at all appears on MEM_WT 562. Therefore, the old data/address remain in the latches. FUL 572 is also late enough so that no pulse at all appears on STAT_WT 708, and the status bit 802 stays low. All signals therefore, retain their pre-write status and the write attempt is ignored.

In view of the above, it can be seen the present invention presents a significant advancement in the art of FIFO architecture and function as it relates to mixed signal and logic technology. A novel FIFO memory storage system accommodates slower memory storage elements to formulate a fast FIFO memory storage system thereby enhancing reliability, reducing manufacturing costs, and reducing design cycle times. Further, this invention has been described in considerable detail in order to provide those skilled in the data communication art with the information needed to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow. For example, although various embodiments have been presented herein with reference to particular FIFO capacities, the present inventive structures and methods are not necessarily limited to such a particular architecture or set of characteristics as used herein. The present invention could just as well be implemented using any FIFO capacity that can be manufactured with presently known manufacturing techniques.

What is claimed is:

1. A FIFO memory storage system comprising:
   a plurality of RAM memory storage elements;
   a write ring-counter operatively coupled to the plurality of RAM memory storage elements and operative to communicate with the plurality of RAM memory storage elements such that data words can be selectively written into the plurality of RAM memory storage elements;
   a read ring-counter operatively coupled to the plurality of RAM memory storage elements and operative to communicate with the plurality of RAM memory storage elements such that data words can be selectively read from the plurality of RAM memory storage elements;
   a data selector operatively coupled to the read ring-counter and the plurality of RAM memory storage elements;
   a data output register; and
   a multiplexer operatively coupled to the plurality of RAM memory storage elements, the data selector and the data output register and operative to selectively transfer data from the plurality of RAM memory storage elements to the data output register via the data selector.

2. The FIFO memory storage system according to claim 1 wherein each RAM memory storage element comprises a static RAM unit, a FIFO unit, and a RAM control unit operatively coupled to the static RAM unit and the FIFO unit, wherein the RAM control unit is operative to cause data to be read from the FIFO unit when such data must be available before a static RAM read cycle can be completed.

3. The FIFO memory storage system according to claim 1 wherein each RAM memory storage element comprises a static RAM unit, a FIFO unit, and a RAM control unit operatively coupled to the static RAM unit and the FIFO unit, wherein the RAM control unit is operative to cause data to be written into the FIFO unit only when the FIFO unit storage capacity has not been exceeded and to cause data to be read from the FIFO unit only when a stored address associated with a data word currently selected by the read ring-counter matches a read count value and further wherein the RAM control unit is operative to cause data to be read from the RAM when the stored address associated with a data word currently selected by the read ring-counter does not match the read count value.

4. The FIFO memory storage system according to claim 3 wherein the RAM control unit is further operative to cause write address data associated with the written data to be stored in the FIFO unit such that the RAM control unit can arbitrate whether RAM unit or FIFO unit data is selected during a read cycle.

5. The FIFO memory storage system according to claim 1 wherein the plurality of RAM memory storage elements comprise at least two dual port static RAM units and a FIFO memory unit associated with each dual port static RAM unit, and further wherein each RAM memory storage element comprises a RAM control unit in communication with its Dual port static RAM unit and its FIFO memory unit and that is operative to cause RAM memory storage element read and write operations to extend over at least two external clock cycles selected from the group consisting of read cycles, write cycles, and combinations thereof.

6. A FIFO memory storage system comprising:
   a plurality of RAM memory storage elements, each RAM memory storage element including a dual port RAM portion and a FIFO portion;
   a write ring-counter operatively coupled to the plurality of RAM memory storage elements and operative to communicate with the plurality of RAM memory storage elements such that data words and associated address data can be selectively written into each dual port RAM portion and each FIFO portion;
   a read ring-counter operatively coupled to the plurality of RAM memory storage elements and operative to communicate with the plurality of RAM memory storage elements such that data words can be selectively read from each dual port RAM portion and each FIFO portion;
   a data selector operatively coupled to the read ring-counter and the plurality of RAM memory storage elements;
   a data output register; and
   a multiplexer operatively coupled to the plurality of RAM memory storage elements, the data selector and the data output register and operative to selectively transfer data from a FIFO portion to the data output register via the data selector when the total FIFO capacity has not been exceeded and to selectively transfer data from RAM portion to the data output register via the data selector when the total FIFO capacity has been exceeded.

7. The FIFO memory storage system according to claim 6 wherein each RAM memory storage element further includes a RAM control portion in communication with its dual port RAM portion and its FIFO portion wherein the RAM control portion is operative to cause data to be read from the FIFO portion when stored data must be available before a dual port RAM portion read cycle can be completed.

8. The FIFO memory storage system according to claim 6 wherein each RAM memory storage element further includes a RAM control portion in communication with its dual port RAM portion and its FIFO portion, wherein the RAM control portion is operative to cause data to be written into both the RAM portion and the FIFO portion and further to cause data to be read from the FIFO portion when the FIFO portion has not exceeded its storage capacity and to cause data to be read from the RAM portion when the FIFO portion has exceeded its storage capacity.

9. The FIFO memory storage system according to claim 8 wherein the RAM control portion is further operative to cause write address data associated with the written data to be stored in the FIFO portion such that the RAM control portion can arbitrate whether RAM portion data or FIFO portion data is selected during a read cycle.

10. The FIFO memory storage system according to claim 6 wherein the plurality of RAM memory storage elements comprise at least two static RAM devices and a FIFO memory associated with each static RAM device, and further wherein each static RAM device comprises a RAM control element in communication with its associated static RAM device and its associated FIFO memory and that is operative to cause static RAM device read and write operations to extend over a number of external clock cycles selected from the group consisting of read cycles, write cycles, and combinations thereof, wherein the number of external clock cycles is dependent on the number of RAM memory storage elements and is no less than two.

11. A FIFO memory storage system comprising:
    a plurality of static RAM memory storage elements;
    a plurality of FIFO memory storage elements;
    a memory control element in communication with the plurality of static RAM memory storage elements and the plurality of FIFO memory storage elements, wherein the memory control element is operative to cause data to be read from the plurality of FIFO memory storage elements when data stored by the FIFO memory storage system must be available before a static RAM memory read cycle can be completed;
    a write ring-counter operatively coupled to the plurality of static RAM memory storage elements and plurality of FIFO memory storage elements and operative to communicate with the plurality of static RAM memory storage elements and plurality of FIFO memory storage elements such that data words and associated address data can be selectively written into each static RAM memory storage element and each FIFO memory storage element;
    a read ring-counter operatively coupled to the plurality of static RAM memory storage elements and plurality of FIFO memory storage elements and operative to communicate with the plurality of static RAM memory storage elements and the plurality of FIFO memory storage elements such that data words can be selectively read from each static RAM memory storage element and each FIFO memory storage element;
    a data selector operatively coupled to the read ring-counter and the plurality of static RAM memory storage elements and plurality of FIFO memory storage elements;
    a data output register; and
    a multiplexer operatively coupled to the plurality of static RAM memory storage elements, the plurality of FIFO memory storage elements, the data selector and the data output register, wherein the multiplexer is operative to selectively transfer data from a FIFO memory storage element to the data output register via the data selector when the total FIFO memory storage element capacity has not been exceeded and to selectively transfer data from a static RAM memory storage element to the data output register via the data selector when the total FIFO memory storage element capacity has been exceeded.

12. The FIFO memory storage system according to claim 11 wherein a data transfer cycle is dependent on a total number of static RAM memory storage elements.

13. The FIFO memory storage system according to claim 11 wherein a data transfer cycle is dependent on a total number of FIFO memory storage elements.

14. The FIFO memory storage system according to claim 11 wherein the memory control element is further operative to cause write address data associated with stored data to be stored in the plurality of FIFO memory storage elements such that the memory control element can arbitrate whether static RAM memory storage data or FIFO memory storage data is selected during a read cycle.

* * * * *